US012744638B2

(12) United States Patent
Grossmann et al.

(10) Patent No.: US 12,744,638 B2
(45) Date of Patent: Sep. 22, 2026

(54) METHODS AND APPARATUSES FOR PHYSICAL UPLINK SHARED CHANNEL BEAMFORMING AND PATHLOSS REFERENCE INDICATION IN A WIRELESS COMMUNICATIONS NETWORK

(71) Applicant: Fraunhofer-Gesellschaft zur Förderung der angewandten Forschung e.V., Munich (DE)

(72) Inventors: Marcus Grossmann, Erlangen (DE); Markus Landmann, Erlangen (DE); Sutharshun Varatharaajan, Erlangen (DE)

(73) Assignee: Fraunhofer-Gesellschaft zur Förderung der angewandten Forschung e.V. (DE)

( * ) Notice: Subject to any disclaimer, the term of this patent is extended or adjusted under 35 U.S.C. 154(b) by 839 days.

(21) Appl. No.: 17/797,303

(22) PCT Filed: Feb. 4, 2021

(86) PCT No.: PCT/EP2021/052707
§ 371 (c)(1),
(2) Date: Aug. 3, 2022

(87) PCT Pub. No.: WO2021/156388
PCT Pub. Date: Aug. 12, 2021

(65) Prior Publication Data

US 2023/0067031 A1 Mar. 2, 2023

(30) Foreign Application Priority Data

Feb. 4, 2020 (EP) .................................... 20155427

(51) Int. Cl.
*H04L 5/00* (2006.01)
*H04W 52/14* (2009.01)
*H04W 52/16* (2009.01)

(52) U.S. Cl.
CPC ......... *H04L 5/0051* (2013.01); *H04W 52/146* (2013.01); *H04W 52/16* (2013.01)

(58) Field of Classification Search
CPC . H04W 52/16; H04W 52/242; H04W 52/325; H04W 52/365; H04W 52/146;
(Continued)

(56) References Cited

U.S. PATENT DOCUMENTS

2019/0261280 A1* 8/2019 Jung .................. H04W 52/386
2022/0201619 A1 6/2022 Yao et al.
(Continued)

FOREIGN PATENT DOCUMENTS

CN 110536394 A 12/2019
CN 110536399 A 12/2019

OTHER PUBLICATIONS

Office Action issued by the European Patent Office on May 27, 2025, Application No. 21702510.5.
(Continued)

*Primary Examiner* — Romani Ohri
(74) *Attorney, Agent, or Firm* — Burr & Forman LLP; Nathaniel T. Quirk, Esq.

(57) ABSTRACT

Methods and apparatuses for PUSCH beamforming and pathloss reference indication in a wireless communications network. A method performed by a UE comprises: receiving from a network node, a PDCCH transmission on a control resource set or a signaling via a higher layer, a higher layer grant, that schedules one or more PUSCH transmission occasions, and receiving, from a network node, via a higher layer, one or more IEs, SRI-PUSCH-PowerControl IEs,
(Continued)

```
TCI-State ::=                SEQUENCE {
    tci-StateId                  TCI-StateId,
    qcl-Type1                    QCL-Info,
    qcl-Type2                    QCL-Info                    OPTIONAL,   -- Need R
    ...
}

QCL-Info ::=                 SEQUENCE {
    cell                         ServCellIndex               OPTIONAL,   -- Need R
    bwp-Id                       BWP-Id              OPTIONAL, -- Cond CSI-RS-Indicated
    referenceSignal              CHOICE {
        csi-rs                       NZP-CSI-RS-ResourceId,
        ssb                          SSB-Index
    },
    qcl-Type                     ENUMERATED {typeA, typeB, typeC, typeD},
    ...
}
```

RRC configuration of the TCI-State Information Element (SoTA [6])

which provide power control settings for the transmission of at least one PUSCH, wherein each SRI-PUSCH-PowerControl IE indicates or maps to at least one pathloss reference RS; obtaining a first pathloss reference RS for a first PUSCH transmission scheduled by said PDCCH or higher layer signaling from a first SRI-PUSCH-PowerControl IE; and obtaining a second pathloss reference RS for a second PUSCH transmission scheduled by said PDCCH or higher layer signaling from a second SRI-PUSCH-PowerControl IE.

10 Claims, 11 Drawing Sheets

(58) Field of Classification Search
CPC ......... H04L 5/0026; H04L 2025/03783; H04L 27/261; H04L 5/0051
See application file for complete search history.

(56) References Cited

U.S. PATENT DOCUMENTS

| | | | | |
|---|---|---|---|---|
| 2022/0264561 | A1* | 8/2022 | Fan | H04W 72/21 |
| 2022/0369242 | A1* | 11/2022 | Matsumura | H04W 52/242 |
| 2023/0039771 | A1* | 2/2023 | Liu | H04W 52/38 |
| 2023/0041109 | A1* | 2/2023 | Ling | H04W 72/1268 |

OTHER PUBLICATIONS

OPPO, Discussion on Multi-beam Operation Enhancements, 3GPP TSG RAN WG1 #98, Prague, CZ, Aug. 26-30, 2019, R1-1908352.

* cited by examiner

```
TCI-State ::=                SEQUENCE {
    tci-StateId                  TCI-StateId,
    qcl-Type1                    QCL-Info,
    qcl-Type2                    QCL-Info                       OPTIONAL,   -- Need R
    ...
}

QCL-Info ::=                 SEQUENCE {
    cell                         ServCellIndex                  OPTIONAL,   -- Need R
    bwp-Id                       BWP-Id              OPTIONAL, -- Cond CSI-RS-Indicated
    referenceSignal              CHOICE {
        csi-rs                       NZP-CSI-RS-ResourceId,
        ssb                          SSB-Index
    },
    qcl-Type                     ENUMERATED {typeA, typeB, typeC, typeD},
    ...
}
```

Figure 1: RRC configuration of the TCI-State Information Element (SoTA [6])

```
P0-PUSCH-AlphaSet ::=                   SEQUENCE {
    p0-PUSCH-AlphaSetId                     P0-PUSCH-AlphaSetId,
    p0                                      INTEGER (-16..15)
    alpha                                   Alpha
}

P0-PUSCH-AlphaSetId ::=                 INTEGER (0..maxNrofP0-PUSCH-AlphaSets-1)

PUSCH-PathlossReferenceRS ::=           SEQUENCE {
    pusch-PathlossReferenceRS-Id            PUSCH-PathlossReferenceRS-Id,
    referenceSignal                         CHOICE {
        ssb-Index                               SSB-Index,
        csi-RS-Index                            NZP-CSI-RS-ResourceId
    }
}

PUSCH-PathlossReferenceRS-Id ::=        INTEGER (0..maxNrofPUSCH-PathlossReferenceRSs-1)


SRI-PUSCH-PowerControl ::=              SEQUENCE {
    sri-PUSCH-PowerControlId                SRI-PUSCH-PowerControlId,
    sri-PUSCH-PathlossReferenceRS-Id        PUSCH-PathlossReferenceRS-Id,
    sri-P0-PUSCH-AlphaSetId                 P0-PUSCH-AlphaSetId,
    sri-PUSCH-ClosedLoopIndex               ENUMERATED { i0, i1 }
}
```

Figure 2: Higher layer configuration of power control parameters for PUSCH (SoTA [6])

METHODS AND APPARATUSES FOR PHYSICAL UPLINK SHARED CHANNEL BEAMFORMING AND PATHLOSS REFERENCE INDICATION IN A WIRELESS COMMUNICATIONS NETWORK

CROSS-REFERENCE TO RELATED APPLICATION

This application is a national stage application, filed under 35 U.S.C. § 371, of International Patent Application No. PCT/EP2021/052707 filed on Feb. 4, 2021, and European Patent Application No. 20155427.6 filed Feb. 4, 2020, which are incorporated by reference herein in their entirety.

TECHNICAL FIELD

The present disclosure relates to the field of wireless communications, and in particular to methods and apparatuses for physical uplink shared channel (PUSCH) beamforming and pathloss reference indication in a wireless communications network such as 5G.

BACKGROUND

In millimeter wave (mmWave) frequencies (frequency range 2 (FR2)), i.e., frequencies above 6 GHz, in general, wireless communication between communication devices is performed with spatially selective/directive transmissions and receptions called beams. Therefore, beam management is a required framework for link establishment, adaptation and recovery at FR2.

In the Third Generation Partnership Project Release 16, (3GPP Rel. 16), beam management in uplink (UL) is handled separately for various UL channels and UL reference signals. The functionalities of the UL beam management framework are spread over three communication layers—the physical (PHY) layer [1-4], the medium access control (MAC) layer [5] and the Radio Resource Control (RRC) layer [6]. In order to enable a beamformed uplink transmission between a User Equipment (UE) and a radio network node (gNB), the beam management performs two tasks: Indication of the beam direction for the UL transmission, and indication of the transmit power settings associated with it. The two tasks are handled in different ways for the physical uplink shared channel (PUSCH), the physical uplink control channel (PUCCH) and the sounding reference signal (SRS).

On the other hand, in the downlink (DL), the UE must be given directives to derive various parameters such as delay spread, average delay, Doppler and Rx beam direction for the reception of a DL channel or reference signal (RS).

The term 'beam' is used in the following to denote a spatially selective/directive transmission of an outgoing signal or reception of an incoming signal which is achieved by precoding/filtering the signal at the antenna ports of the device with a particular set of coefficients. The words precoding or filtering may refer to processing of the signal in the analog or digital domain. The set of coefficients used to spatially direct a transmission/reception in a certain direction may differ from one direction to another direction. The term 'Tx beam' denotes a spatially selective/directive transmission and the term 'Rx beam' denotes a spatially selective/directive reception. The set of coefficients used to precode/filter the transmission or reception is denoted by the term 'spatial filter'. The term 'spatial filter' is used interchangeably with the term 'beam direction' in this document as the spatial filter coefficients determine the direction in which a transmission/reception is spatially directed to.

In case of the UE, the 'spatial relation' for an UL channel 'Uc' or RS 'Ur' with respect to or with reference to a DL or UL RS 'R' means that the UE uses the spatial filter used to receive or transmit the RS 'R' to transmit the UL channel 'Uc' or RS 'Ur', or it means that the UE uses the spatial filter used to receive or transmit the RS 'R' as a reference to determine the spatial filter used to transmit the UL channel 'Uc' or RS 'Ur'.

The term 'higher layer' in the following, when used in isolation, denotes any communication layer above the physical layer in the protocol stack.

The term serving cell and carrier component (CC) may be used interchangeably in this disclosure as a serving cell configured for a UE and is usually a separate physical carrier centered around a particular carrier frequency. Depending on the frequency of a component carrier/serving cell, the size of the cell and the beamformed reference signals may vary.

In the following, the state of the art (SoTA) for UL and DL beam management and pathloss reference signals in 3GPP is discussed. The discussions are centered around the beam management of PUSCH. This is followed by the discussion of the deficiencies in the SoTA with respect to PUSCH beam management, especially with respect to multi-TRP (Transmit-Receive Point) communications. A transmit-receive point (TRP) may be a base station or a network node; and one or more base station(s) may be associated with a network node (e.g., gNodeB or gNB).

Downlink Transmission Configuration Indication

The physical downlink control channel (PDCCH) and the physical downlink shared channel (PDSCH) carry DL control information (DCI) and DL data, respectively, to a UE [1-6].

The PDCCH is configured at the Radio Resource Control (RRC) layer level by a base station or a network node or gNodeB (gNB). The gNB transmits the PDCCH(s) on one or more Control Resource Sets (CORESETs) that are configured at RRC level. A CORESET is a set of resource blocks carrying control information. Each CORESET comprises one or more PDCCH(s), each linked to a search space configuration. The UE monitors the configured search spaces to obtain the PDCCH(s). A PDCCH is either part of a common search space (CSS) or a UE-specific Search Space (USS). The UE monitors the configured search spaces to obtain the PDCCH(s). PDCCHs belonging to the CSS usually contain information that is broadcast by the gNB to all UEs, like system information broadcast or paging information. The PDCCHs belonging to a USS contain UE specific information, such as the Downlink Control Information (DCI) to schedule a PDSCH or PUSCH or SRS trigger, etc.

It should be noted that the terms PDCCH and DCI may be used interchangeably in this document. Both terms refer to a downlink control channel information obtained via the physical layer.

Demodulation Reference Signals (DMRS) are embedded for the coherent demodulation of the PDCCH/PDSCH at the UE. The DMRS consists of a set of DMRS ports. The number of DMRS ports determines the number of transmission layers contained in a PDSCH. DMRS is used for channel estimation at the UE to coherently demodulate the PDSCH or PDCCH(s). In the case of PDCCH, one or more of them may be transmitted on a CORESET. Therefore, the DMRS for the coherent demodulation of the PDCCH(s) on the CORESET may be embedded across the PDCCH(s) transmitted on the CORESET.

An important parameter in the transmission of the PDCCH and the PDSCH is the 'Transmission Configuration Indication'-state (TCI-state) [4]. In 3GPP Rel. 16, the indication of how the control or the shared channel is transmitted by the gNB and what assumptions the UE must consider while receiving them is done via Reference Signals (RSs). The indication to the UE is performed using a TCI-state Information Element (IE) configured via RRC, as shown in FIG. 1. A TCI-state IE comprises the following elements:

One of more reference signal(s), and for each reference signal, one or more Quasi-CoLocation (QCL) assumptions.

The TCI-state is used to mention or indicate how to receive a PDSCH or the PDCCH(s) transmitted on a CORESET. Applying a TCI-state to a PDSCH or CORESET implies that the DMRS ports of the PDSCH or the DMRS ports of the PDCCH(s), transmitted on the CORESET, shall be assumed to be quasi-colocated (QCL) with the reference signals mentioned in the TCI-state according to the corresponding quasi-colocation assumptions for the reference signal mentioned in the TCI-state.

Assuming 'quasi-colocation' means that certain channel parameters such as Doppler shift/spread, delay spread, average delay and/or Tx beam direction are assumed to be the same for the DL RS mentioned in the TCI-state and the DMRS ports of the PDSCH, or the DMRS ports of the PDCCH(s) transmitted on the CORESET. Four different QCL types can be indicated in 3GPP Rel. 16 [4]:

'QCL-TypeA': {Doppler shift, Doppler spread, average delay, delay spread}

'QCL-TypeB': {Doppler shift, Doppler spread}

'QCL-TypeC': {Doppler shift, average delay}, and

'QCL-TypeD': {Spatial Rx parameter}.

As shown above, the QCL information may also include a reception type parameter such as the spatial Rx (Receiver) parameter. One or more of the QCL-Info parameters is/are included in the TCI-state IE to provide the QCL assumption (s) associated with the TCI-state.

For example, a TCI-state IE comprising a DL reference signal 'A' with QCL assumption 'QCL-typeA' and a DL reference signal 'B' with QCL-assumption 'QCL-TypeD' is considered. Applying this TCI-state to a PDSCH or CORESET with the given QCL assumptions means that the UE shall assume the same Doppler shift, Doppler spread, average delay and delay spread for the DMRS ports of the PDSCH or the DMRS ports of the PDCCH(s) transmitted on the CORESET and the DL reference signal A, and the UE shall use the same spatial filter to receive the DL reference signal 'B' and the DMRS ports of the PDSCH or the DMRS ports of the PDCCH(s) transmitted on the CORESET.

Usually, the TCI state that is used to schedule a PDCCH or a PDSCH contains the identifiers (IDs) of Channel State Information Reference Signals (CSI-RS) or Synchronization Signal Blocks (SSB) along with the QCL assumptions for each reference signal. The RS in the TCI-state is usually a RS that the UE has measured before, so that it can use it as a reference to receive the DMRS of the PDCCH or PDSCH, and hence demodulate the same. The indication of a TCI-state for a CORESET or a PDSCH is performed via at least one MAC Control Element (MAC-CE) message or using the TCI-indication field in the DCI used to schedule the PDSCH.

In FR2, where the gNB and UE establish a connection via spatially selective/directive beams, the TCI-state is used to indicate the beam directions in which the UE must receive, i.e., the spatial filter to be used by the UE to receive a PDSCH/PDCCH(s) via a 'qcl-TypeD' assumption with a CSI-RS or an SSB that the UE has already received. The determination of the DL Tx beam to transmit PDCCH(s)/PDSCH is performed via a beam sweeping procedure. In a beam sweeping procedure, the gNB configures a set of DL RSs (CSI-RS or SSB) for the UE to measure in the DL via the RRC. Each of the configured DL RS may be transmitted with a different spatial filter, i.e., each of the configured DL RS may be transmitted in a different direction by the gNB. The UE measures each of the configured DL RS by receiving them using one or more spatial filters—the RSs may all be received with the same spatial filter or a different spatial filter may be used to receive each RS. Following the measurements, the UE sends a beam report to the gNB. The beam report may comprise the indices of $1 \leq L \leq 4$ configured DL RSs (essentially, L DL Tx beam directions, with each beam direction resulting from the use of a specific spatial filter at the gNB) along with the received power for each of the RSs [4]. Based on the beam report, the gNB determines one or more suitable DL Tx beam direction(s), i.e., spatial filter(s) for the transmission of the PDCCH(s) and the PDSCH.

Physical Uplink Shared Channel (Pusch)

The PUSCH transmission(s) from a UE can be dynamically scheduled by a network node via an UL grant indicated in the PDCCH or semi-persistently/statically scheduled with the higher layer configured grant configuredGrantConfig. The configured grant Type 1 PUSCH transmission is semi-statically configured to operate upon the reception of a higher layer parameter of configuredGrantConfig including rrc-ConfiguredUpfinkGrant without the detection of an UL grant in the PDCCH. The configured grant Type 2 PUSCH transmission is semi-persistently scheduled by an UL grant in a valid activation PDCCH [3] after the reception of the higher layer parameter configuredGrantConfig not including rrc-ConfiguredUpfinkGrant [4].

The higher layer configurations of the PUSCH and the configuredGrantConfig according to the New Radio (NR) specifications [6] are shown in the following:

Higher Layer Configuration of PUSCH

```
PUSCH-Config ::=                    SEQUENCE {
  dataScramblingIdentityPUSCH         INTEGER (0..1023)                                  OPTIONAL, -- Need S
  txConfig                            ENUMERATED {codebook, nonCodebook}                 OPTIONAL, -- Need S
  dmrs-UplinkForPUSCH-MappingTypeA    SetupRelease { DMRS-UplinkConfig }                 OPTIONAL, -- Need M
  dmrs-UplinkForPUSCH-MappingTypeB    SetupRelease { DMRS-UplinkConfig }                 OPTIONAL, -- Need M
  pusch-PowerControl                  PUSCH-PowerControl                                 OPTIONAL, -- Need M
  frequencyHopping                    ENUMERATED {intraSlot, interSlot }                 OPTIONAL, -- Need S
  frequencyHoppingOffsetLists         SEQUENCE (SIZE (1..4)) OF INTEGER (1.. maxNrofPhysicalResourceBlocks−1)
                                                                                         OPTIONAL, -- Need M
  resourceAllocation                  ENUMERATED { resourceAllocationType0, resourceAllocationType1, dynamicSwitch},
  pusch-TimeDomainAllocationList      SetupRelease { PUSCH-TimeDomainResourceAllocationList }  OPTIONAL, -- Need M
  pusch-AggregationFactor             ENUMERATED { n2, n4, n8 }                          OPTIONAL, -- Need S
  mcs-Table                           ENUMERATED {qam256, qam64LowSE}                    OPTIONAL, -- Need S
```

-continued

```
  mcs-TableTransformPrecoder        ENUMERATED {qam256, qam64LowSE}                  OPTIONAL, -- Need S
  transformPrecoder                 ENUMERATED {enabled, disabled}                   OPTIONAL, -- Need S
  codebookSubset                    ENUMERATED {fullyAndPartialAndNonCoherent, partialAndNonCoherent,nonCoherent}
                                                                                     OPTIONAL, -- Cond codebookBased
  maxRank                           INTEGER (1..4)                                   OPTIONAL, -- Cond codebookBased
  rbg-Size                          ENUMERATED { config2}                            OPTIONAL, -- Need S
  uci-OnPUSCH                       SetupRelease { UCI-OnPUSCH}                      OPTIONAL, -- Need M
  tp-pi2BPSK                        ENUMERATED {enabled}                             OPTIONAL, -- Need S
  ...
}
UCI-OnPUSCH ::=                   SEQUENCE {
  betaOffsets                       CHOICE {
    dynamic                           SEQUENCE (SIZE (4)) OF BetaOffsets,
    semiStatic                        BetaOffsets
  }                                                                                    OPTIONAL, -- Need M
  scaling                           ENUMERATED { f0p5, f0p65, f0p8, f1 }
}
```

Higher Configuration of confiquredGrantConfiq

```
ConfiguredGrantConfig ::=         SEQUENCE {
  frequencyHopping              Enumerated {intraSlot, interSlot}
                                                                OPTIONAL, -- Need S
  cg-DMRS-Configuration         DMRS-UPlinkConfig,
  mcs-Table                     ENUMERATED {qam256, qam64LowSE}
                                                                OPTIONAL, -- Need S
  mcs-TableTransformPrecoder    ENUMERATED {qam256, qam64LowSE}
                                                                OPTIONAL, -- Need S
  uci-OnPUSCH                   SetupRelease {CG-UCI-OnPUSCH}
                                                                OPTIONAL, -- Need M
  resourceAllocation            ENUMERATED{resourceAllocationType0,
                                  resourceAllocationType1,
                                  dynamicSwitch},
    ENUMERATED {config2}
                                                                OPTIONAL, -- Need S
  powerControlLoopToUse           ENUMERATED {n0, n1},
  p0-PUSCH-Alpha                  P0-PUSCH-AlphaSetId,
  transformPrecoder               ENUMERATED {enabled, disabled}
                                                                OPTIONAL, -- Need S
  nrofHARQ-Processes              INTEGER(1..16),
  repK                            ENUMERATED {n1, n2, n4, n8},
  repK-RV                         ENUMERATED {s1-0231, s2-0303, s3-0000}
                                                                OPTIONAL, -- Need R
  periodicity                   ENUMERATED {sym2, sym7, sym1x14,
                                    sym2x14, sym4x14, sym5x14, sym8x14,
                                    sym10x14, sym16x14, sym20x14,
                                    sym32x14, sym40x4, sym64x14,
                                    sym80x14, sym128x14, sym160x14
                                    sym256x14, sym320x14, sym512x14,
                                    sym640x14, sym1024x14, sym1280x14,
                                    sym2560x14, sym5120x14, sym6, sym1x12,
                                    sym2x12, sym4x12, sym5x12, sym8x12,
                                    sym10x12, sym16x12, sym20x12,
                                    sym32x12, sym40x12, sym64x12,
                                    sym80x12, sym128x12, sym160x12,
                                    sym256x12, sym320x12, sym512x12,
                                    sym640x12, sym1280x12, sym2560x12},
  configuredGrantTimer            INTEGER (1..64)
                                                                OPTIONAL, -- Need R
  rrc-ConfiguredUplinkGrant         SEQUENCE {
      timeDomainOffset              INTEGER (0..5119),
      TimeDomainAllocation          INTEGER (0..15),
      frequencyDomainAllocation     BIT STRING (SIZE(18)),
      antennaPort                   INTEGER (0..31),
      dmrs-SeqInitialization        INTEGER (0..1)
                                                                OPTIONAL, -- Need R
      precodingAndNumberOfLayers    INTEGER (0..63),
      srs-ResourceIndicator         INTEGER (0..15)
                                                                OPTIONAL, -- Need R
      mcsAndTBS                   INTEGER (0..31),
      frequencyHoppingOffset      INTEGER (1..
```

-continued

```
                                                              maxNrofPhysicalResourceBlocks-1)
                                                                OPTIONAL, -- Need R
    pathlossReferenceIndex          INTEGER (0..
                                                            maxNrofPUSCH-PathlossReferenceRSs-1),
                                                              OPTIONAL, -- Need R
  }
}
CG-UCI-OnPUSCH ::= CHOICE {
  Dynamic                        SEQUENCE (SIZE (1..4)) OF BetaOffsets,
semiStatic                       BetaOffsets)
```

The mode of transmission of the PUSCH is determined by the higher layer parameter 'txConfig'. The parameter can be set to either 'codebook' or 'nonCodebook' or it may not be configured. When the PUSCH is scheduled via the PDCCH, two different downlink control information (DCI) formats may be used in the scheduling-PDCCH—DCI format 0_0 or DCI format 01. The codebook- and non-codebook-based PUSCH transmissions are scheduled using downlink control information (DCI) format 0_1 [4], when scheduled via the PDCCH. When scheduling the PUSCH using DCI format 0_1, the gNB indicates the ports from which the UE has to transmit via the SRS resource indicator (SRI). The SRI field in DCI format 0_1 indicates one or more SRS resource(s) from a codebook or non-codebook SRS resource set, which means that the UE must transmit the PUSCH via the SRS ports associated with the SRS resources indicated via the SRI.

In the case of codebook-based-PUSCH, the precoding of the ports for the PUSCH transmission is indicated via the scheduling PDCCH. In the non-codebook case, the precoding of the ports for the PUSCH transmission is either predetermined or left for UE implementation [1-4]. It is also possible that the PUSCH scheduled via a PDCCH using DCI format 0_1 may not contain an SRI field—it happens when the SRS resource set that the SRI uses to indicate the ports to transmit the PUSCH from contains only one SRS resource. For a codebook or non-codebook-based PUSCH scheduled via a higher layer grant, the SRI is indicated by the scheduling grant, when applicable. When 'txConfig' is not configured, the UE does not expect the PUSCH to be scheduled using DCI format 0_1. When the PUSCH is scheduled with DCI format 0_0, the UE uses a single port for the PUSCH transmission [4].

The two parameters of PUSCH that are of interest in the exemplary embodiments according to the present invention are the spatial relation and the pathloss reference RS.

The beam direction/spatial relation of the PUSCH is determined from the beam direction/spatial relation of an SRS or a PUCCH resource depending on the mode of PUSCH transmission:

- Codebook- or non-codebook-based PUSCH transmission is indicated with an SRS resource. The UE sounds the UL channel with SRS resources (which are configured specifically for the codebook/non-codebook transmission mode) and the gNB, in return, schedules the PUSCH via the indication of an SRS resource. The UE, thereby, transmits the PUSCH from the same ports from which the SRS resource was transmitted and uses the same beam direction/spatial relation for the transmission of the PUSCH as for the transmission of the SRS resource.
- When the UE is scheduled by DCI format 0_0 (single-port PUSCH), the spatial relation used for the transmission of the PUSCH is the same as that used for the transmission of the PUCCH resource with the lowest ID in the currently active UL bandwidth part (BWP).

The pathloss reference RS, which is configured/indicated via a higher layer, is used in the power control settings of the PUSCH to determine the pathloss estimate for the transmission of the PUSCH [3]. The pathloss reference RS for the PUSCH is determined in different ways for different modes of PUSCH transmission. The PUSCH is configured with a list of pathloss reference RSs in PUSCH-PathlossReferenceRS' IEs and in most cases, it uses the list to obtain the pathloss reference RS.

- For codebook- or non-codebook-based PUSCH transmission scheduled by the PDCCH, the pathloss reference RS is configured in 'SRI-PUSCH-PowerControl' IEs (as shown in FIG. 2, SoTA [6]). SRI stands for SRS Resource Indicator. These IEs contain the power control settings for the PUSCH such as the ID of a PUSCH-pathlossReferenceRS, 'alpha' values (pathloss compensation factor) and the closed loop power control index. The mapping between the PUSCH-pathlossReferenceRS IEs and the SRI-PUSCH-PowerControl IEs can be modified using Medium Access Control-Control Element (MAC-CE) messages [3]. The SRS resource indicator (SRI) mentioned for the codebook/non-codebook PUSCH transmission maps to a 'SRI-PUSCH-PowerControl' IE that provides these power control settings. When there is no SRI field in the scheduling PDCCH, the UE uses the SRI-PUSCH-PowerControl whose ID value is set to 0.
- For single-port PUSCH (scheduled by the PDCCH via DCI format 0_0), the pathloss reference RS is obtained from the same PUCCH resource that it obtains the spatial relation from.
- When the PUSCH is scheduled by a higher layer grant, the pathloss reference RS to be used is indicated via a pathlossReferenceIndex that points to a PUSCH-pathlossReferenceRS IE or is obtained from the SRI-PUSCH-PowerControl whose ID value is set to 0 when there is no SRS resource indicator field.

The transmit power of PUSCH is thereby determined from a combination of open loop and closed loop power control parameters. If a UE transmits a PUSCH on active UL BWP b of carrier f of serving cell c using parameter set configuration with index j and PUSCH power control adjustment state with index l, the UE determines the PUSCH transmission power in PUSCH transmission occasion i as:

$$P_{PUSCH,b,f,c}(i, j, q_d, l) = \min\left\{\begin{array}{l} P_{CMAX,f,c}(i), \\ P_{O\_PUSCH,b,f,c}(j) + 10\log_{10}\left(2^{\mu} \cdot M_{RB,b,f,c}^{PUSCH}(i)\right) + \\ \alpha_{b,f,c}(j) \cdot PL_{b,f,c}(q_d) + \Delta_{TF,b,f,c}(i) + f_{b,f,c}(i, l) \end{array}\right\} [dBm]$$

where, $P_{CMAX,f,c}(i)$ is the configured maximum UE transmit power defined in [7] and [8].

$P_{O\_PUSCH,b,f,c}(j)$ is a parameter composed of the sum of the nominal PUSCH transmission power $P_{O\_NOMINAL\_PUSCH,f,c}(j)$ and $P_{O\_UE\_PUSCH,b,f,c}(j)$ both of which are configured via a higher layer by the gNB [3].

$$M^{PUSCH}_{RB,b,f,c}(i)$$

is the bandwidth of the PUSCH resource assignment expressed in number of resource blocks.

$PL_{b,f,c}(q_d)$ is a downlink pathloss estimate in dB calculated by the UE using DL reference signal (RS) index $q_d$. The configuration/indication of the pathloss reference RS is as described above.

$a_{b,f,c}(j)$ is a pathloss compensation factor configured via higher layer by the gNB.

$f_{b,f,c}(i,l)$ is a closed loop power correction function that changes depending on the transmit power control (TPC) feedback from the gNB.

$\Delta_{TF,b,f,c}(i)$ is a power offset value dependent on the modulation and coding scheme (MCS) used for the PUSCH.

In 3GPP Rel. 16, default spatial relations and pathloss reference RS assumptions were defined for UL channels/RSs, i.e., the 3GPP specification provides directives to identify the spatial relation and pathloss reference RS of an UL channel/RS in case they are not explicitly configured or indicated. In scenarios where beamformed transmissions are used (common in frequency range 2), the pathloss reference and the spatial relation may be derived from a downlink channel. This means the DL RS used as a reference to obtain the beam direction for receiving a DL channel (e.g., indicated via the TCI state) at the UE may be used as a reference to derive the spatial relation for an UL channel or UL RS and used in the calculation of the pathloss estimate for the Tx power calculation of the UL transmission.

Defining default spatial relations and pathloss reference RSs helps the network to avoid explicit indication of the parameters, especially in FR2 deployments, thereby reducing control information overhead and latency. In the case of PUSCH, the default assumptions in 3GPP Rel. 16 are obtained from a CORESET or from PUCCH resources configured on the CC (Component Carrier), depending on whether there are PUCCH resources configured on the CC or not [3], [4].

The deficiencies of current 3GPP NR specifications in providing default spatial relation and pathloss reference RS in multi-TRP scenarios is apparent. When the UE is configured to receive multiple CORESETs from multiple TRPs, or when PUCCH resources are transmitted to different TRPs, or when a single PDCCH schedules multiple PUSCHs, the UE defaults to a single TRP for the spatial relation and pathloss reference RS derivation according to the current NR specification. Hence, the default assumptions are not applicable in multi-TRP scenarios. Therefore, default spatial relations and pathloss reference RSs need to be defined for multi-TRP scenarios to perform beam management operations with reduced overhead and latency similar to the single-TRP scenario.

SUMMARY

In view of the above drawbacks, it is an objective of the embodiments herein to provide at least methods to determine (default) spatial relations and/or pathloss reference RSs for PUSCH that apply in both single-TRP and multi-TRP scenarios and to address other deficiencies regarding the same in the state of the art.

According to another aspect of some embodiments herein, there is provided a method performed by a UE, the method comprising: receiving from a network node, a physical downlink control channel, PDCCH, transmission on a control resource set or a signaling via a higher layer, a higher layer grant, that schedules one or more physical uplink shared channel, PUSCH, transmission occasions, and receiving, from a network node, via a higher layer, one or more SRI-PUSCH-PowerControl IEs which provide power control settings for the transmission of at least one PUSCH, wherein each IE indicates or maps to at least a pathloss reference RS; obtaining a first pathloss reference RS for a first PUSCH transmission scheduled by the PDCCH or higher layer signalling from a first SRI-PUSCH-PowerControl IE; and obtaining (403) a second pathloss reference RS for a second PUSCH transmission scheduled by the PDCCH or higher layer signalling from a second SRI-PUSCH-PowerControl IE.

According to another aspect of some exemplary embodiments herein, a method performed by a UE comprises, receiving a single physical link downlink control channel, PDCCH, transmission or a higher layer grant from a network node that schedules at least one PUSCH transmission occasion; and deriving a spatial relation and/or a RS as pathloss reference for the PUSCH transmission(s) or PUSCH transmission occasions(s), with reference to at least one RS, from QCL information provided in at least one TCI-state associated with one or more PDSCH(s); wherein the QCL information provides a relationship between one or more reference signals and DMRS port(s) of the PDSCH(s) or PDCCH (s) and the relationship indicates channel parameter(s) or reception type parameter(s) that are obtained from the RSs; and wherein the TCI-state is a higher layer configured parameter that comprises the QCL information.

According to another aspect of some exemplary embodiments herein, a method performed by a UE comprises, receiving, from a network node, a higher layer configuration that associates a PUSCH or a PUSCH grant with a CORESETpoolIndex which is a higher layer parameter in a configuration of at least one CORESET, wherein the CORESET comprises resources on which a PDCCH is transmitted from the network node; and wherein at least one PUCCH resource configured for the UE is associated with a CORESETpoolIndex value via higher layer configuration; and deriving or obtaining a spatial relation and/or a pathloss reference RS for the PUSCH, from the spatial relation and/or pathloss reference RS of a PUCCH, resource associated with the CORESETpoolIndex.

According to another aspect of some exemplary embodiments herein, a method performed by a UE comprises, receiving, from a network node, a higher layer configuration that associates a PUSCH or a PUSCH grant with a CORESETpoolIndex which is a higher layer parameter in a configuration of at least one CORESET, wherein the CORESET comprises resources on which a PDCCH is transmitted from the network node; and deriving a spatial relation and/or a pathloss reference RS for a PUSCH, with reference to at least one RS, from QCL information of a CORESET; wherein the QCL information provides a relationship between one or more reference signals and demodulation reference signal, DMRS, port(s) of the PDCCH(s) transmitted on the CORESET, and the relationship indicates channel parameter(s) or reception type parameter(s) that are obtained from the reference signals.

According to an aspect of some embodiments herein, there is provided a method performed by a UE, the method comprising: receiving, from a network node, at least one PDCCH, transmitted by the network node on at least a CORESET, wherein the at least one PDCCH schedules at least one PUSCH; and deriving a spatial relation and/or a pathloss reference RS, for the PUSCH(s), with reference to at least one reference signal, from QCL information of the CORESET; wherein the QCL information comprises a relationship between one or more reference signals and DMRS port(s) of the PDCCH(s) transmitted on the CORESET, and the relationship indicates channel parameter(s) or reception type parameter(s) that are obtained from the reference signals.

According to another aspect of embodiments herein, there is provided a UE comprising a processor and a memory containing instructions executable by the processor, whereby said UE is operative to perform any one of the subject matters described herein.

There is also provided a computer program comprising instructions which when executed on at least one processor of the UE, cause the at least said one processor to carry out methods described herein.

According to another aspect of embodiments herein, there is provided a network node comprising a processor and a memory containing instructions executable by the processor, whereby said network node is operative to perform methods as described herein.

There is also provided a computer program comprising instructions which when executed on at least one processor of the network node, cause the at least said one processor to carry out methods described herein.

A carrier is also provided containing the computer program, wherein the carrier is one of a computer readable storage medium; an electronic signal, optical signal or a radio signal.

An advantage of embodiments herein is to reduce latency and overhead of control information for the beam direction (or spatial relation) indication of PUSCH transmissions.

Additional advantages of the embodiments herein are provided in the detailed description of this disclosure.

BRIEF DESCRIPTION OF THE DRAWINGS

FIG. 1 depicts an RRC configuration of the TCI-state Information Element (state of the art (SoTA)).

FIG. 2 depicts a higher layer configuration of power control parameters for PUSCH (SoTA)

DETAILED DESCRIPTION

Figure 3:
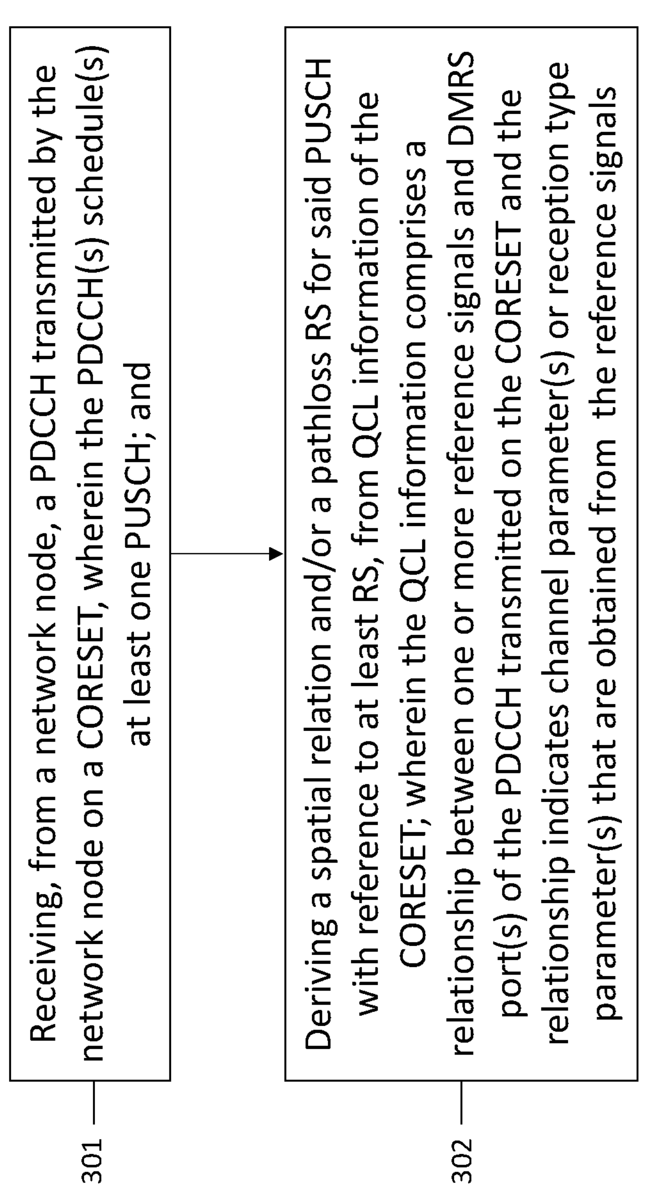
FIG. 3 illustrates a flowchart of a method performed by a UE according to some embodiments.

In the following, a detailed description of the exemplary embodiments is described in conjunction with the drawings, in several scenarios to enable easier understanding of the solution(s) described herein.

In the present exemplary embodiments, the deficiencies of the 3GPP specifications in indicating spatial relation(s) and pathloss reference RS for PUSCH in various scenarios is addressed. The issue of deriving the UL beams for the UE from the beams of DL and UL channels for the PUSCH is discussed. The solutions proposed are intended to address issues that may especially be of concern in beamformed multi-TRP communications that are common in FR2 deployments and other deficiencies in the state of the art related to beam management as previously described.

Hence, methods are presented to obtain default spatial relation and pathloss reference RS assumptions for PUSCH, along with extensions of PUSCH pathloss reference RS update in the state of the art.

In the following, different solutions for deriving pathloss reference RS and spatial relation for PUSCH transmissions are discussed based on the scheduling method of PUSCH:

1) PUSCH scheduled via PDCCHs from multiple TRPs.
2) Multiple PUSCHs scheduled via a single PDCCH
3) PUSCH(s) scheduled via a higher layer grant.

It is noted that the information in the above section is for enhancing the understanding of the background of the present embodiments according to the present invention, and it may contain information that does not form prior art.

It is further noted that several embodiments described in the following may be implemented individually or in combination. In other words, some or all of the described embodiments may be combined—unless mutually exclusive.

1) Multi-PDCCH-Based Multi-TRP PUSCH

The following exemplary embodiments describe methods for deriving the spatial relation and the pathloss reference RS from QCL assumptions or QCL information of a scheduling-PDCCH for PUSCH transmissions to multiple TRPs or multiple network nodes.

As mentioned before, the pathloss reference RS is used to calculate the pathloss estimate which is used in determining the transmit power of the PUSCH [3]. In FR2 scenarios, where beamformed transmissions are used, the pathloss reference and the spatial relation may be derived from an RS indicated for a downlink channel to the UE. This means the DL RS used as a reference to obtain the beam direction for receiving the DL channel at the UE (e.g., indicated in the QCL assumptions or QCL information for a CORESET or a PDSCH) may be used as a spatial relation or as a reference in the calculation of the pathloss estimate of the Tx power calculation for the UL transmission.

Before describing the different embodiments, a parameter denoted a control resource set pool index (CORESETpoolIndex) is described. The CORESETpoolIndex is a parameter introduced in 3GPP Rel. 16 [4] in the configuration of a CORESET. This parameter or this index essentially groups CORESETs into different pools according to the TRPs they are associated to in the case of multi-TRP transmissions. The PDCCHs transmitted on the CORESETs configured with the same CORESETpoolIndex value are considered to be associated with the same TRP.

A CORESET belonging or associated to a CORESET-poolIndex means that the higher layer configuration of the CORESET may comprise said CORESETpoolIndex (value).

When a UE is configured, by the network node, with multiple CORESETpoolIndex values, the UE understands that it may receive PDSCHs from multiple TRPs, possibly overlapped in time and frequency domains, scheduled by multiple PDCCHs that are received on CORESETs configured with different CORESETpoolIndex values.

As previously described, a network node may transmit a PDCCH on one or more CORESETs. The PDCCH may be used to schedule at least one PUSCH.

According to a first exemplary embodiment, the UE is configured to derive a spatial relation and/or a pathloss reference RS for a PUSCH with reference to one of the reference signals (RSs) from QCL assumptions of the CORESET on which the PDCCH, scheduling the PUSCH, is transmitted.

For example, the spatial relation and/or pathloss reference RS for the PUSCH may be obtained with reference to the RSs indicated with ‘QCL-TypeD’ in the QCL assumptions of the CORESET on which the scheduling-PDCCH is transmitted. This means when two PDCCHs associated with different values of CORESETpoolIndex schedule PUSCH transmissions, the UE obtains or acquires the spatial relation and/or pathloss reference RS for the PUSCH from the QCL assumptions of the CORESET on which the PDCCH scheduling the PUSCH is transmitted, thereby allowing for dynamic association of the PUSCH with a TRP via the physical layer.

The QCL information or QCL assumption of a CORESET comprises a relationship between one or more RSs and demodulation reference signal (DMRS) ports of the PDCCH or the DMRS ports or the PDSCH, transmitted on the CORESET. The relationship also indicates channel parameter(s) or reception type parameter(s) that are obtained from the RSs.

As previously described, there are different QCL types defined in 3GPP Rel. 16 [4] which are repeated below:

‘QCL-TypeA’: {Doppler shift, Doppler spread, average delay, delay spread}

‘QCL-TypeB’: {Doppler shift, Doppler spread}

‘QCL-TypeC’: {Doppler shift, average delay}

‘QCL-TypeD’: {Spatial Rx parameter}

As previously disclosed, the spatial relation for a PUSCH with respect to or with reference to a DL or UL RS ‘R’ means that the UE uses the spatial filter used to receive or transmit the RS ‘R’ to transmit the PUSCH, or the UE uses the spatial filter used to receive or transmit the RS ‘R’ as a reference to determine the spatial filter used to transmit the PUSCH.

Hence, according to the first exemplary embodiment, the UE is configured to receive from a network node (or a gNB or a TRP), at least one PDCCH, transmitted by the network node on a CORESET, wherein the PDCCH(s) schedule(s) at least one PUSCH; and the UE is configured to derive a spatial relation and/or a pathloss reference RS for the PUSCH, with reference to at least one RS, from QCL information of the CORESET; wherein the QCL information comprises a relationship between one or more reference signals and DMRS port(s) of the PDCCH, and the relationship indicates channel parameter(s) or reception type parameter(s) that are obtained from the reference signals.

Moreover, the selective application of the (derived) spatial relation and/or pathloss reference RS for PUSCH may be performed according to the DCI format carried by the PDCCH and used to schedule the PUSCH. In the case of PUSCH scheduled with DCI format 00 and/or DCI format 0_1 where the PDCCH does not contain an SRS resource indicator field, this method may be used to obtain the spatial relation and/or pathloss reference RS in the case of multi-TRP transmissions.

The method, according to an exemplary embodiment, may be applied when the UE is not configured by the network node explicitly with a spatial relation and/or pathloss reference RS for PUSCH transmissions either via the physical layer or a higher layer, or when enabled via a higher layer parameter. It is applicable to both single-TRP and multi-TRP scenarios in case when CORESETs are configured on the serving cell, on which the PUSCH is scheduled.

According to a second exemplary embodiment, which is a variation of the first exemplary embodiment, the UE is configured to receive a higher layer parameter from the gNB or any other network entity, indicating whether the spatial relation and/or pathloss reference RS for a PUSCH is derived with reference to one of the RSs from the QCL information or the QCL assumptions of a CORESET on which the PDCCH scheduling the PUSCH is transmitted. In an example, the spatial relation and/or pathloss reference RS for the PUSCH is obtained with reference to the RS indicated with ‘qcl-TypeD’ in the QCL information or the QCL assumptions of the CORESET on which the scheduling-PDCCH is transmitted when said parameter is configured (e.g., the higher layer parameter from the network node is set to ‘enabled’).

In addition, the method, according to the previously described first or second exemplary embodiment, may selectively be applied only when more than one value is assigned to the CORESETpoolIndex (i.e., in a multi-TRP scenario).

According to a third exemplary embodiment, which is a variation of previously described first exemplary embodiment, the UE is configured to derive the spatial relation and/or pathloss reference RS for a PUSCH with reference to one of the RSs from the QCL assumptions or QCL information of the CORESET on which the PDCCH scheduling the PUSCH is transmitted, when the UE is configured with more than one value for the CORESETpoolIndex. If more than one CORESETpoolIndex is configured, this indicates that the PDCCHs may be received from different TRPs (e.g. from at least two different TRPs). Additionally, by the configuration of a higher layer parameter, this feature may be enabled or disabled at the UE.

As previously described, the SRI-PUSCH-PowerControl IEs comprise or provide power control settings for the transmission of PUSCH such as the pathloss reference RS, ‘alpha’ values (pathloss compensation factor) and the closed loop power control index [3] (also shown in FIG. 2). The mapping of the pathloss reference RS to an SRI-PUSCH-PowerControl IE may be modified via MAC-CE messages [3]. In the case of codebook and non-codebook-based PUSCH transmissions, the SRI-PUSCH-PowerControl IE(s) that the SRS resource indicator in the scheduling PDCCH maps to is used in the power control settings for the transmission of the corresponding PUSCH.

In the following method, the SRI-PUSCH-PowerControl IEs are used in obtaining the power control settings for multi-TRP-based PUSCH.

According to a fourth exemplary embodiment, the UE is configured to obtain a pathloss reference RS for a PUSCH transmission from an SRI-PUSCH-PowerControl IE with identity or identification (ID) value i, when it is scheduled by a CORESET associated with CORESETpoolIndex $c_i$ and the pathloss reference RS for a PUSCH transmission from an SRI-PUSCH-PowerControl IE with ID value j, when it is scheduled by a CORESET associated with CORESETpoolIndex $c_j$. It means that for PUSCHs scheduled with PDCCHs transmitted on CORESETs associated with different CORESETpoolIndex values (i.e., the CORESETs are associated with different TRPs), the UE may obtain the pathloss reference RSs from different SRI-PUSCH-PowerControl IEs.

The mapping between the CORESETpoolIndex and the SRI-PUSCH-PowerControl IE ID(s) may be configured via a higher layer (e.g., RRC, or MAC-CE), or the mapping between the CORESETpoolIndex and the SRI-PUSCH-PowerControl IE ID(s) may be known by the UE, e.g., it is fixed in the specification.

An example of a fixed mapping is given in the following. A PUSCH scheduled using a CORESET associated with CORESETpoolIndex 0 may obtain its pathloss reference RS from SRI-PUSCH-PowerControl IE with ID 0 and a PUSCH scheduled using a CORESET associated with CORESETpoolIndex 1 may obtain its pathloss reference RS from SRI-PUSCH-PowerControl IE with ID 1 and so on. With this method, the pathloss reference RS corresponding to different TRPs (i.e., CORESET pools) can be indicated via MAC-CE messages that update the mapping between an SRI-PUSCH-PowerControl IE and a pathloss reference RS.

The method may be selectively applicable to PUSCHs scheduled using DCI format 0_0 and/or PUSCHs scheduled using DCI format 0_1 without an SRI field. The method may be enabled or disabled via the configuration of a higher layer parameter to the UE.

Hence, according to an exemplary embodiment, the UE is configured to receive, from a network node, via a higher layer configuration, one or more SRI-PUSCH-PowerControl IEs, which provide power control settings for the transmission of at least one PUSCH, wherein each IE indicates or maps to at least one pathloss reference RS. The UE obtains a (first) pathloss reference RS for a first PUSCH transmission from a first SRI-PUSCH-PowerControl IE; and obtains a (second) pathloss reference RS for a second PUSCH transmission from a second SRI-PUSCH-PowerControl IE, and so on, depending on the number of CORESETpoolIndex values configured via a higher layer.

According to a fifth exemplary embodiment, which is a variation of the fourth exemplary embodiment, the UE is configured to receive, from a network node, a higher layer parameter that enables the following UE behavior: the pathloss reference RS for a PUSCH transmission scheduled by a CORESET associated with CORESETpoolIndex $c_i$ is obtained from an SRI-PUSCH-PowerControl IE with ID value i, and the pathloss reference RS for a PUSCH transmission scheduled by a CORESET associated with CORESETpoolIndex $c_j$ is obtained from an SRI-PUSCH-PowerControl IE with ID value j. The mapping between the CORESETpoolIndex and the SRI-PUSCH-PowerControl IE ID(s) may be configured via a higher layer (e.g., RRC, or MAC-CE), or the mapping between the CORESETpoolIndex and the SRI-PUSCH-PowerControl IE ID(s) may be known by the UE, e.g., it is fixed in the specification.

An extension to this method is to use the pathloss reference RS for the spatial relation for PUSCH transmissions as proposed in the following exemplary embodiment.

According to a sixth exemplary embodiment, the UE is configured to obtain the spatial relation for a PUSCH transmission scheduled by a CORESET associated with CORESETpoolIndex $c_i$ with reference to the PUSCH pathloss reference RS indicated by or mapped to the SRI-PUSCH-PowerControl IE with ID value i, and the spatial relation for a PUSCH transmission scheduled by a CORESET configured with CORESETpoolIndex $c_j$ with reference to the PUSCH pathloss reference RS indicated by or mapped to the SRI-PUSCH-PowerControl IE with ID value j. This behavior may also be enabled or disabled via a higher layer parameter. The mapping between the CORESETpoolIndex and the SRI-PUSCH-PowerControl IE ID(s) may be configured via a higher layer (e.g., RRC, or MAC-CE), or the mapping between the CORESETpoolIndex and the SRI-PUSCH-PowerControl IE ID(s) may be known by the UE, e.g., it is fixed in the specification.

2) Single-PDCCH-Based Multi-TRP PUSCH (with and without CORESETs in the PUSCH Serving Cell)

The following exemplary embodiments provide solutions for spatial relation and pathloss reference RS indication for PUSCH transmissions to multiple TRPs (or network nodes) by a single PDCCH.

In 3GPP Rel. 16, each SRI-PUSCH-PowerControl IE maps to a value of an SRI that is indicated by the DCI. When the PUSCH-scheduling-PDCCH comprises an SRI, the pathloss reference RS for the corresponding PUSCH transmission is obtained from the SRI-PUSCH-PowerControl IE that the SRI maps to. Furthermore, it is also possible to update the pathloss reference RS mapping to an SRI-PUSCH-PowerControl IE via a MAC-CE message, which offers a low latency update of the same. One method to obtain the pathloss reference RS for PUSCH in single-PDCCH-based multi-TRP PUSCH transmissions that offers a low latency indication is based on SRI-PUSCH-PowerControl IEs as explained in the following.

According to a seventh exemplary embodiment, the UE is configured to obtain the pathloss reference RS for PUSCH transmissions from n SRI-PUSCH-PowerControl IEs, when n PUSCHs are scheduled via a single PDCCH. It means that for n PUSCHs scheduled with a single PDCCH to be transmitted to different TRPs, the UE obtains the pathloss reference RSs from n different SRI-PUSCH-PowerControl IEs. The pathloss reference RSs corresponding to different TRPs are explicitly updated via MAC-CE by updating their mapping with the corresponding SRI-PUSCH-PowerControl IEs. In one example, if two PUSCHs are scheduled by a single PDCCH, the pathloss reference RSs are obtained from the two SRI-PUSCH-PowerControl IEs associated with the lowest IDs. In addition, the RSs used for the pathloss reference may also be used as a reference for the spatial relation of the PUSCH transmission.

Scheduling of n (n≥1) PUSCH(s) via a single PDCCH or a single higher layer grant means that the PDCCH or the higher layer grant schedules n (n≥1) PUSCH transmission occasions, i.e., the transmission of n (n≥1) PUSCH transport blocks.

The method may be applicable when the PUSCH is scheduled using DCI format 0_0 or DCI format 0_1 when there is no SRI field in the DCI. In addition, it is also applicable when the scheduling CORESET is from a different cell or a different network node (or gNB).

The spatial relation and/or pathloss reference RS may also be obtained from the TCI-states of the PDSCHs that are configured via a higher layer. Different schemes are proposed in the following that select suitable TCI-states for deriving the spatial relation and the pathloss reference RS in the case of single-PDCCH-based multi-TRP PUSCH transmissions. Since the schemes are based on the TCI-state indication of a PDSCH, they can also be applied in a serving cell where no CORESETs are configured as well.

According to an eighth exemplary embodiment, the UE is configured to obtain the spatial relation and/or pathloss reference RS for PUSCH transmissions with reference to the RSs in the QCL assumptions of the active TCI-states associated with the PDSCH(s), when PUSCHs are scheduled via a single PDCCH or a higher layer grant. This means that for each of the n (n≥1) PUSCH(s) scheduled with a single PDCCH, the UE may obtain the spatial relation and/or pathloss reference RS with reference to one of the RSs in the QCL assumptions of one of the active TCI-states associated with a PDSCH.

An active TCI-state may be a TCI-state that has been down-selected via a MAC-CE message from the N TCI-states configured (i.e., a MAC-CE message may select q≤N TCI-states from the N higher-layer-configured TCI-states) for the indication of one or more PDSCH transmission occasion(s), or it may be a TCI-state that was used or is being used for the transmission of a PDSCH.

In one example, the chosen TCI-states used for the n (n≥1) PUSCH(s) may be the n (n≥1) active TCI-state(s) for the n PDSCH(s) with the lowest ID values. The spatial relation and/or pathloss reference RS for the i-th PUSCH transmission scheduled by a single PDCCH may then be obtained with reference to the RS indicated with 'qcl-TypeD' in the QCL assumptions or QCL information of the active TCI-state for the PDSCH with the i-th lowest ID. Based on this method, the spatial relation(s) and/or pathloss reference RS(s) are automatically updated when the DL beam(s) indicated by the TCI states for the PDSCH(s) are changed.

According to an exemplary embodiment, the TCI-states for the PDSCH(s) which are down-selected by MAC-CE are used for the spatial relation and/or pathloss reference RS indication for PUSCH transmissions. The network node may configure via a higher layer N TCI-states used to indicate N DL transmissions. By a MAC-CE command, the network node may down-select $2^b$≤N TCI-states from the N higher-layer-configured TCI-states for the indication of the TCI state for the transmission of a PDSCH. The TCI-state for one or more PDSCH(s) may be indicated via a b-bit TCI-field in the PDCCH. Each code-point of the b-bit TCI-field in the PDCCH that schedules one or more PDSCH(s) maps to the down-selected TCI-state(s). This means, each codepoint in the b-bit TCI-field of the PDSCH-scheduling-PDCCH may map to M≥1 TCI-states, wherein each of the M TCI state(s) may be associated with one or more of the following: a PDSCH transmission occasion, a subset of the DMRS port(s) of the scheduled PDSCH(s), specific time and/or frequency domain resources and in case of a multi-TRP transmission, a TRP. The default assumptions on the spatial relation and/or pathloss reference RS for the PUSCH transmissions may be obtained from the TCI-states corresponding to one of the code-points of the TCI field.

According to a ninth exemplary embodiment, the UE is configured to obtain/derive the spatial relation and/or pathloss reference RS for PUSCH transmission(s) with reference to the RSs in the QCL assumptions of the TCI-states that map to one of the codepoints of the b-bit TCI-field in the PDCCH that schedules one or more PDSCH transmission occasion(s). For example, the spatial relation and/or pathloss reference RS for the i-th PUSCH transmission of the n (n>1) PUSCH transmissions, scheduled by a single PDCCH, may be obtained with reference to the RS indicated with 'qcl-TypeD' in the QCL assumptions of the i-th TCI-state associated with the lowest codepoint (i.e., codepoint '0') of the b-bit TCI-field in the PDSCH-scheduling-PDCCH. In a variation of this example, the chosen codepoint of the TCI-field may be the one with the lowest value among the ones that map to n (n>1) TCI-states.

3) PUSCH Scheduled Via Higher Layer Grant

For the case when a PUSCH is scheduled via a higher layer grant and CORESETs are configured on the CC in which the PUSCH is transmitted, the association of the spatial relation and/or pathloss reference RS with a DL channel may be performed via a higher layer.

According to a tenth exemplary embodiment, the UE is configured to receive a higher layer configuration or indication that associates a PUSCH or a PUSCH grant with a CORESETpoolIndex. When the UE receives such a higher layer configuration, it derives the spatial relation and/or pathloss reference RS for the PUSCH with reference to one of the RSs from the QCL assumptions of one of the CORESETs associated with the indicated CORESETpoolIndex.

With this method, the UE may be scheduled with multiple PUSCHs associated with multiple TRPs, whose spatial relation and/or pathloss reference RS may be implicitly derived from said CORESETs. Hence, any beam change to a CORESET results in a beam change for the corresponding PUSCH.

The higher layer configuration may, for example, be performed by including the CORESETpoolIndex in the 'ConfiguredGrantConfig' or 'PUSCH-Config' or 'rrc-ConfiguredUplinkGrant' IEs among others.

In an alternative method, the spatial relation or pathloss reference RS for the PUSCH may be derived from a PUCCH resource. PUCCH resources are transmitted in the uplink and carry control information such as Hybrid Automatic Repeat Request (HARQ) feedback (i.e., the acknowledgements of the received transport block transmitted in the downlink), scheduling requests (SRs) and downlink channel state information (CSI). PUCCH resources may be associated with a CORESETpoolIndex value via a higher layer (i.e., to group them according to the TRP they are associated with). With such a higher layer configuration/indication associating a PUCCH resource with a CORESETpoolIndex, the UE may choose the spatial relation and pathloss reference RS for the PUSCH from a PUCCH resource associated with the same CORESETpoolIndex.

According to an eleventh exemplary embodiment, the UE is configured to receive a higher layer configuration or indication that associates a PUSCH or a PUSCH grant with a CORESETpoolIndex. When the UE receives such a higher layer configuration, it obtains the spatial relation and/or pathloss reference RS for the PUSCH from the spatial relation and/or pathloss reference RS of a PUCCH resource associated with the indicated CORESETpoolIndex. For example, the UE may obtain the spatial relation and/or pathloss reference RS for the PUSCH from the PUCCH resource with the lowest ID among the ones configured in the same UL bandwidth part as the PUSCH and associated with the same CORESETpoolIndex as the PUSCH.

The above methods of higher layer association of a PUSCH or a PUSCH grant with a CORESETpoolIndex may be applicable when the PUSCH is scheduled via the higher layer grant or scheduled using a PDCCH.

In the case when the PUSCH is scheduled via a higher layer grant and there are no CORESETs configured on the CC on which the PUSCH is transmitted, the methods described previously to derive the spatial relation and/or pathloss reference RS from the TCI-states associated with the PDSCHs can be used.

According to another exemplary embodiment, the UE is configured to obtain the spatial relation and/or pathloss reference RS for PUSCH transmissions with reference to the RSs in the QCL assumptions or QCL information of n active TCI-states of the PDSCH, when n (n≥1) PUSCHs are scheduled via a single higher layer grant. It means that when n (n≥1) PUSCHs are scheduled with a single higher layer grant, the UE may obtain the spatial relation and/or pathloss reference RSs for each PUSCH transmission with reference to one of the RSs in the QCL assumptions of one of the active TCI-states of the PDSCHs.

For example, the chosen TCI-states may be the n (n≥1) active TCI-states with the lowest ID values for PDSCHs. The spatial relation and/or pathloss reference RS for the i-th PUSCH transmission scheduled by a higher layer grant (that schedules n (n≥1) PUSCH transmissions) may then be obtained with reference to the RSs indicated with 'qcl-TypeD' in the QCL assumptions of the i-th active TCI-state for PDSCH with the lowest TCI-state ID value. With this method, the spatial relation and/or pathloss reference RS are automatically updated as the DL beams for the PDSCHs are updated.

According to a twelfth exemplary embodiment, the UE is configured to obtain the spatial relation and/or pathloss reference RS for PUSCH transmissions with reference to the RSs in the QCL assumptions of the TCI-states that map to one of the codepoints of the b-bit TCI-field in the PDCCH that schedules one or more PDSCH transmission occasion (s).

For example, the spatial relation and/or pathloss reference RS for the i-th PUSCH transmission scheduled by a higher layer grant (that schedules n PUSCH transmissions (n≥1)) may be obtained with reference to the RS indicated with 'qcl-TypeD' in the QCL assumptions of the i-th TCI-state that maps to the lowest codepoint (i.e., codepoint '0') of the b-bit TCI-field in the PDSCH-scheduling-PDCCH. In a variation of the example, the chosen codepoint of the TCI-field may be the one with the lowest value among the ones that map to n TCI-states.

In any of the embodiments described in this disclosure that are related to the usage of higher layer configuration or signaling for the association of one or more CORESET-poolIndex value(s) with one or more PUSCH transmission(s) or PUSCH transmission occasion(s), the usage of PHY layer indication or signaling or the usage of any fixed rule(s) in the specifications (there is no signaling or transmission of messages to the UE involved; the UE knows the method/procedure beforehand) for the same purpose may also be applicable.

Update of Pathloss Reference RS for PUSCH Scheduled by Higher Layer Grant Via MAC-CE In 3GPP Rel. 16, a MAC-CE-based update of pathloss reference RS for PUSCH was introduced. It applies to PUSCH scheduled via a PDCCH (via DCI format 0_0 or 0_1) and PUSCH scheduled via a higher layer grant without an SRI. It does not apply to the case when the PUSCH is scheduled via a higher layer grant and with an SRI. The pathloss reference RS in this case is obtained from the higher layer parameter 'pathlossReferenceIndex' in the PUSCH grant which indicates one of the PUSCH-PathlossReferenceRS' IEs [6]. This means that the pathloss reference RS update for the PUSCH may be performed only via RRC reconfiguration. The following exemplary embodiments propose a solution that lowers the latency of the control signaling over the RRC reconfiguration for indicating the pathloss reference RS for PUSCH scheduled via a higher layer grant.

In a thirteenth exemplary embodiment, the UE is configured to obtain a pathloss reference RS for a PUSCH transmission configured with a higher layer grant from an SRI-PUSCH-PowerControl IE. For a PUSCH transmission with a higher layer grant configured with an SRS resource indicator (SRI), the UE obtains the pathloss reference RS that is mapped to or indicated by the SRI-PUSCH-PowerControl IE that is indicated by the SRI. The mapping between the SRI and the SRI-PUSCH-PowerControl IE ID(s) may be configured via a higher layer (e.g., RRC, or MAC-CE), or the mapping may be known by the UE, e.g., it is fixed in the specification. For example, the SRI-PUSCH-PowerControl IE chosen may be the one with the same value of the SRI, i.e., a PUSCH scheduled via a higher layer grant comprising an SRS resource indicator value of '0' may indicate the SRI-PUSCH-PowerControl IE with ID 0. The corresponding PUSCH is transmitted with a Tx power obtained from the pathloss estimate provided by the pathloss reference RS mapped to or indicated by the SRI-PUSCH-PowerControl IE with ID value 0. With this method, the MAC-CE based update of the pathloss reference RS for the PUSCH can be performed by indicating the mapping of the pathloss reference RS to the SRI-PUSCH-PowerControl IE(s) which has a lower latency compared to the higher layer based update using the parameter 'pathlossReferenceIndex'.

The method may also be applied when the UE is configured with a higher layer parameter that enables pathloss reference RS update as described in the NR specification [3], [6]. Therefore, when the UE knows that it may receive MAC-CE messages for the update of pathloss reference RSs for PUSCH via MAC-CE (as indicated by the parameter enablePLRSupdateForPUSCHSRS [3], for example), the UE applies the above method of obtaining the pathloss reference RS via the SRI-PUSCH-PowerControl IEs.

According to a fourteenth exemplary embodiment, which is a variation of the thirteenth exemplary embodiment, the UE is configured to obtain a pathloss reference RS for a PUSCH transmission configured with a higher layer grant from a SRI-PUSCH-PowerControl IE, when the UE is configured with the higher layer parameter that enables the reception of MAC-CE-based pathloss reference RS update for PUSCH or MAC-CE-based update of the mapping between a pathloss reference for PUSCH and a SRI-PUSCH-PowerControl IE. For a PUSCH transmission with a higher layer grant configured with an SRS resource indicator, the UE uses the SRI-PUSCH-PowerControl IE that the indicated SRS resource indicator value maps to, to obtain at least the pathloss reference RS.

Referring to FIG. 3, there is illustrated a flowchart of a method performed by a UE according to previously described embodiments. As shown, the method comprises:

(301) receiving, from a network node (gNB or TRP), at least one PDCCH, transmitted by the network node on a CORESET, wherein the at least one PDCCH schedules at least one PUSCH, and (302) deriving a spatial relation and/or a pathloss reference signal, RS, for the PUSCH(s), with reference to at least one RS, from QCL information of the CORESET; wherein the QCL information comprises a relationship between one or more reference signals and demodulation reference signal, DMRS, port(s) of the PDCCH, and the relationship indicates channel parameter(s) or reception type parameter(s) that are obtained from the reference signals.

As previously described, the method comprises receiving from the network node, a higher layer parameter indicating whether the spatial relation and/or pathloss reference RS for the PUSCH is derived with reference to one or more of the reference signals from the QCL information of the CORESET on which the PDCCH scheduling the PUSCH is transmitted.

The method further comprises, deriving the spatial relation and/or the pathloss reference RS for the PUSCH, when the UE is configured with more than one value of a CORESETpoolIndex.

Figure 4:
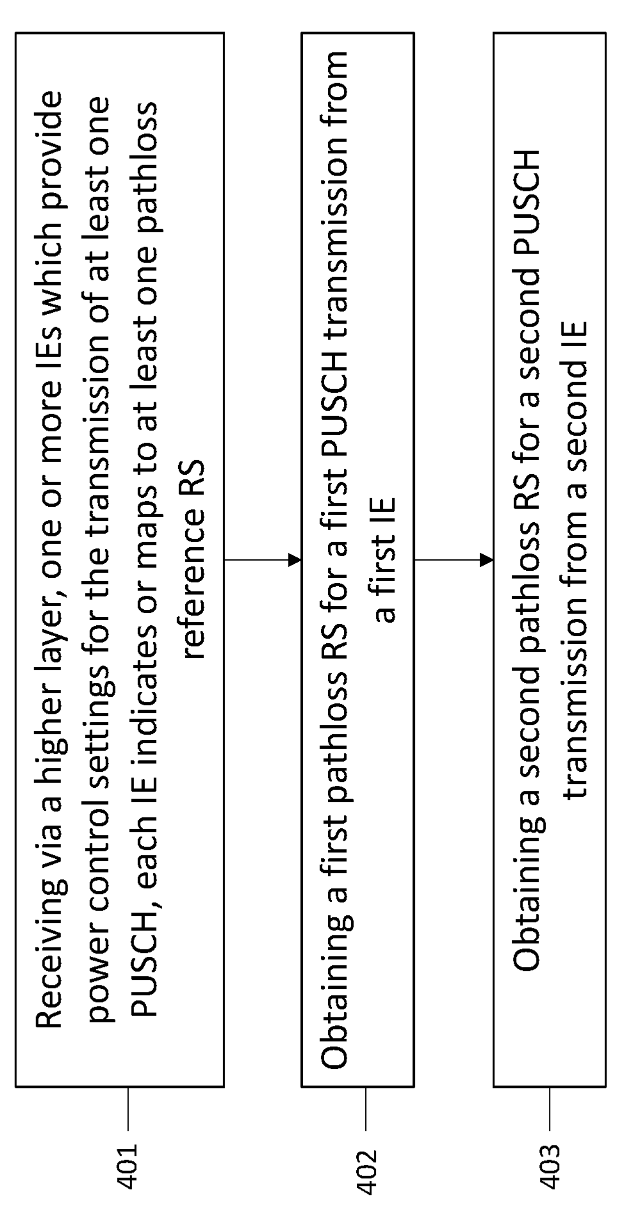
FIG. 4 illustrates a flowchart of a method performed by a UE according to some embodiments.

Referring to FIG. 4, there is illustrated a flowchart of a method performed by a UE according to some exemplary embodiments. As shown, the method comprises:

(401) receiving, from a network node, via a higher layer, one or more SRI-PUSCH-PowerControl IEs which provide power control settings for the transmission of at least one PUSCH, wherein each SRI-PUSCH-PowerControl IE indicates or maps at least one pathloss reference RS;

(402) obtaining a first pathloss reference RS for a first PUSCH transmission from a first SRI-PUSCH-PowerControl IE, and (403) obtaining a second pathloss reference RS for a second PUSCH transmission from a second SRI-PUSCH-PowerControl IE.

The method further comprises, obtaining the pathloss reference RS for said PUSCH transmissions when each PUSCH transmission is scheduled via a different CORESET, where each CORESET is configured with a different CORESETpoolIndex. The method further comprises obtaining the pathloss reference RS for said PUSCH transmissions when said PUSCH transmissions are scheduled via a single DCI, or via a single PDCCH. The method further comprises, receiving, from the network node, a higher layer parameter, for obtaining the first and second pathloss reference RSs.

Figure 5:
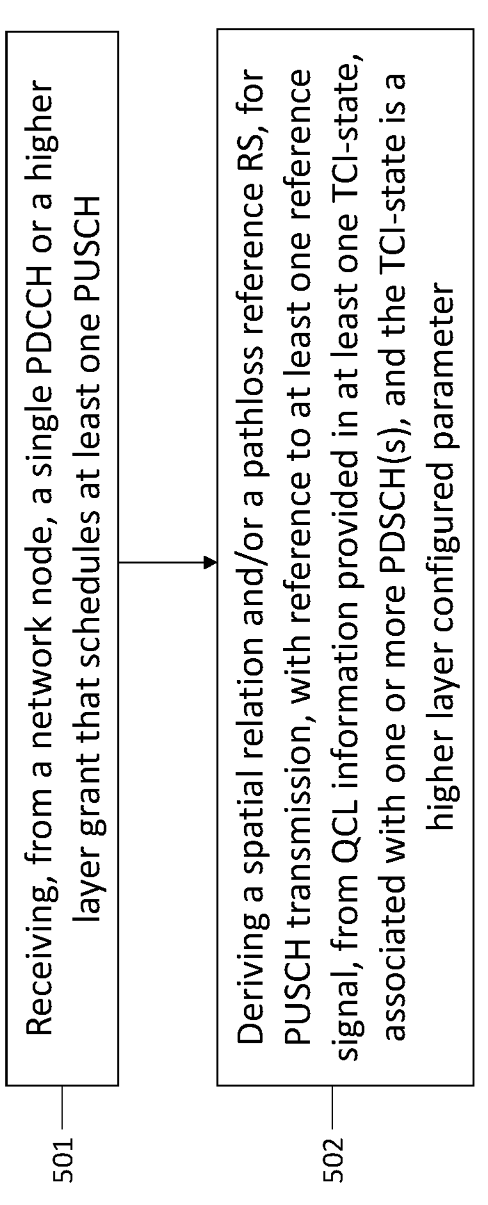
FIG. 5 illustrates a flowchart of a method performed by a UE according to some embodiments.

Referring to FIG. 5, there is illustrated a flowchart of a method performed by a UE, as previously described. As shown, the method comprises:

(501) receiving a single PDCCH or a higher layer grant from a network node that schedules at least one PUSCH; and (502) deriving a spatial relation and/or a RS as pathloss reference for PUSCH transmission, with reference to at least one RS from QCL information provided in at least one TCI-state, associated with one or more PDSCHs; wherein the QCL information of a PDSCH comprises a relationship between one or more reference signals and DMRS port(s) of the PDSCH and the relationship indicates channel parameter(s) or reception type parameter(s) that are obtained from the reference signals; and wherein the TCI-state is a higher layer configured parameter that comprises the QCL information. The spatial relation and/or the pathloss reference RS for said PUSCH(s) may be derived from the TCI-state which is indicated by a codepoint of a TCI-filed of a PDCCH that schedules the PDSCH(s).

Figure 6:
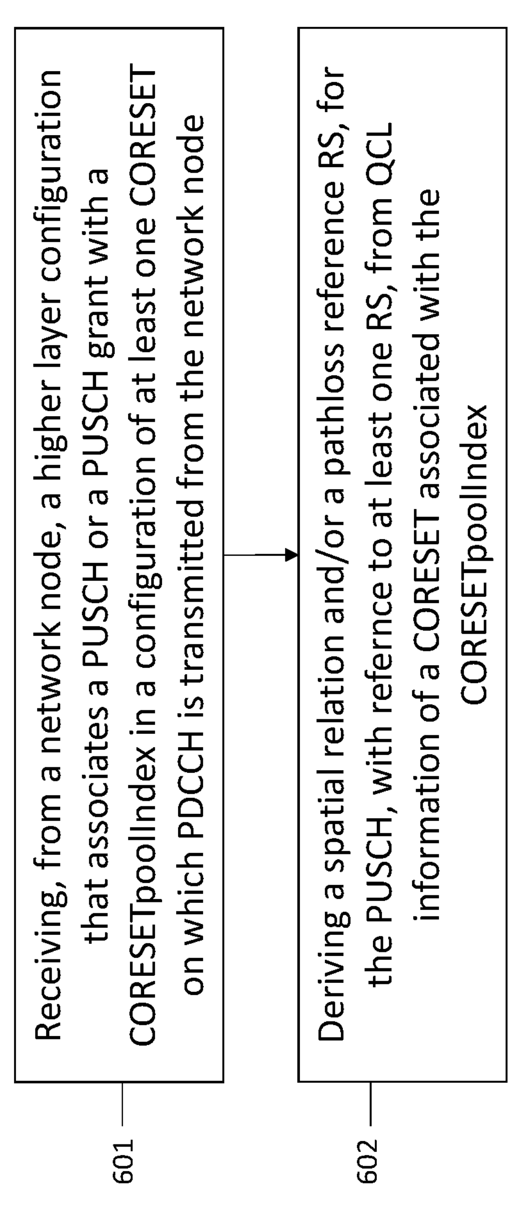
FIG. 6 illustrates a flowchart of a method performed by a UE according to some embodiments.

Referring to FIG. 6, there is illustrated a flowchart of a method performed by a UE according to previously described embodiments. As shown, the method comprises:

(601) receiving from a network node, a higher layer configuration that associates a PUSCH or a PUSCH grant with a CORESETpoolIndex, wherein the CORESETpoolIndex is a higher layer parameter in a configuration of at least one CORESET that comprises resources on which a PDCCH is transmitted from the network node; and (602) deriving a spatial relation and/or a pathloss reference RS for the PUSCH, with reference to at least one RS from QCL information of a CORESET associated with said CORESETpoolIndex; wherein the QCL information comprises a relationship between one or more RSs and DMRS port(s) of the PDCCH, and the relationship indicates channel parameter(s) or reception type parameter(s) that are obtained from the RSs.

The method further comprises, deriving a transmit power of said PUSCH transmission from a pathloss estimate with a reference to a RS associated with the QCL information of the CORESET having the lowest identification number (ID) among the CORESETs associated with the CORESETpoolIndex.

Figure 6A:
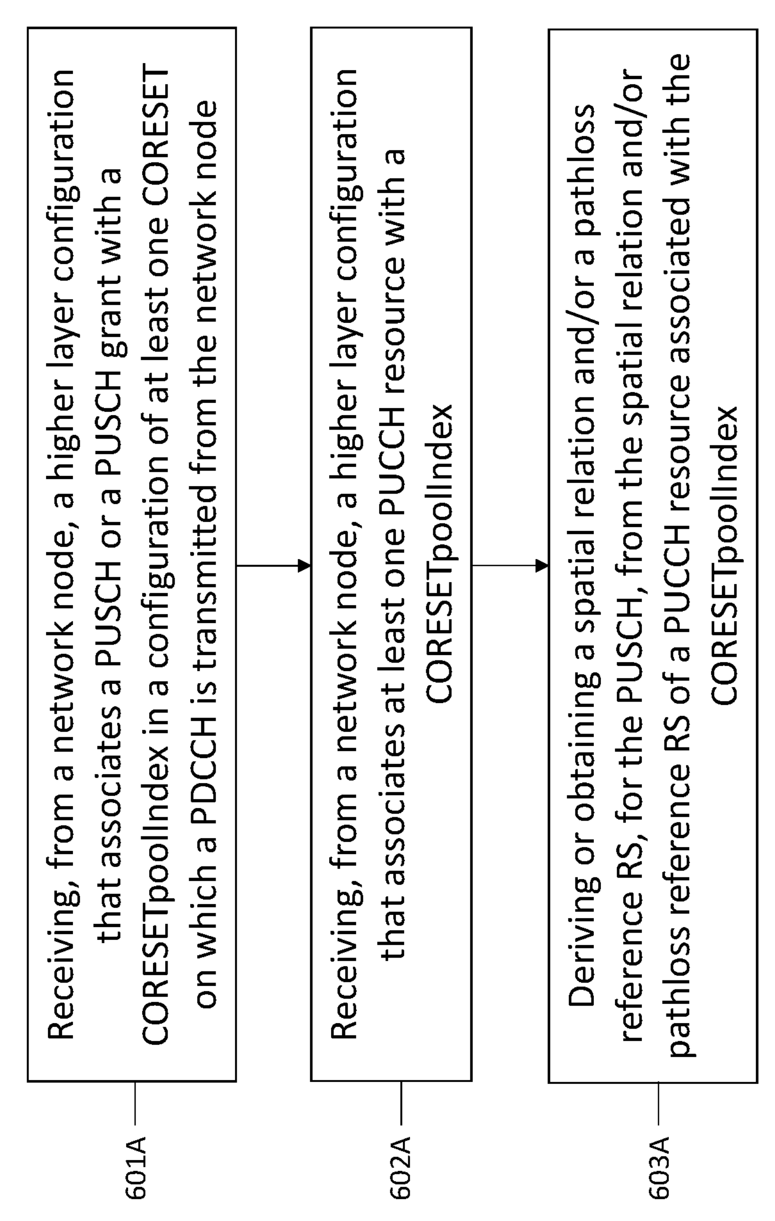
FIG. 6A illustrates a flowchart of a method performed by a UE according to some embodiments.

Referring to FIG. 6A, there is illustrated a flowchart of another method performed by a UE according to previously described embodiments, in which a higher layer configuration associates a PUSCH or a PUSCH grant with a CORESETpoolIndex.

As shown in FIG. 6A, the method comprises:

(601A) receiving from a network node, a higher layer configuration that associates a PUSCH or a PUSCH grant with a CORESETpoolIndex, wherein the CORESETpoolIndex is a higher layer parameter in a configuration of at least one CORESET that comprises resources on which a PDCCH is transmitted from the network node; and (602A) receiving from a network node, a higher layer configuration that associates at least one PUCCH resource with a CORESETpoolIndex; and (603A) obtaining or deriving a spatial relation and/or a pathloss reference RS for the PUSCH, from the spatial relation and/or pathloss reference RS, of a PUCCH resource associated with said CORESETpoolIndex.

According to an embodiment, the method comprises, deriving a transmit power for said PUSCH transmission from a pathloss estimate with the pathloss reference RS of the PUCCH resource having the lowest identification number (ID) among the PUCCH resources associated with said CORESETpoolIndex.

According to an embodiment, the method comprises, obtaining the spatial relation for said PUSCH transmission from the spatial relation of the pathloss reference RS of the PUCCH resource having the lowest ID among the PUCCH resources associated with said CORESETpoolIndex.

According to another embodiment, the method comprises obtaining the pathloss reference RS or the spatial relation for said PUSCH from the PUCCH resource having the lowest ID among the PUCCH resources associated with said CORESETpoolIndex in the same UL bandwidth part (BWP) as the PUSCH.

Figure 7:
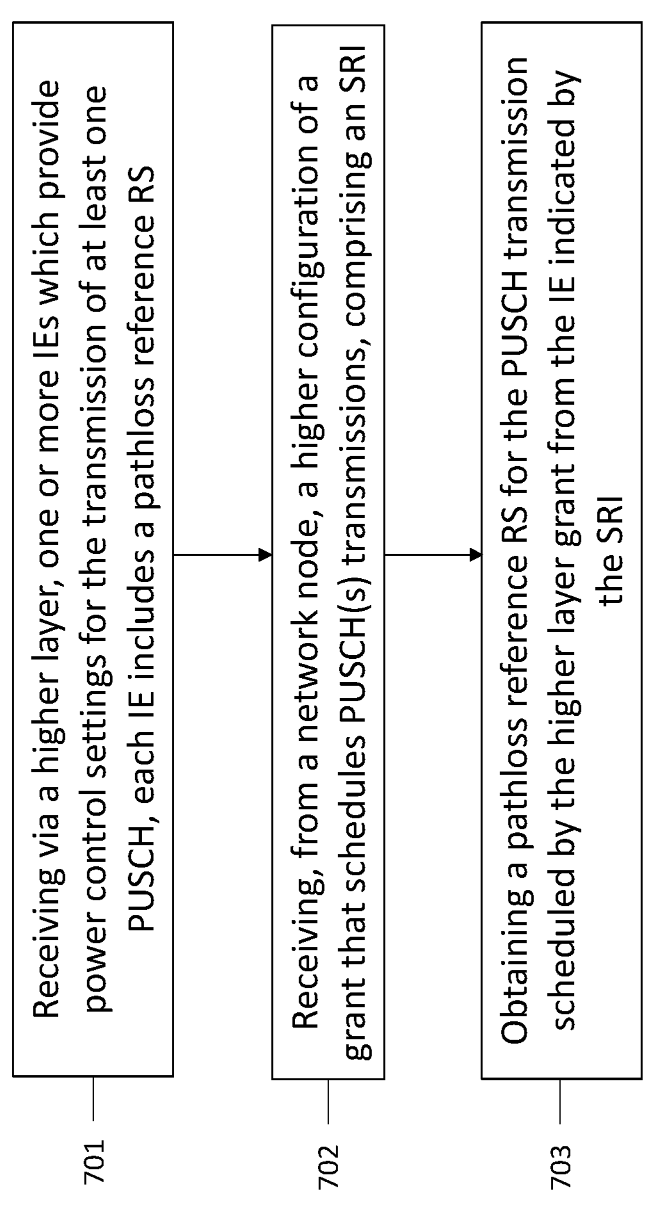
FIG. 7 illustrates a flowchart of a method performed by a UE according to some embodiments.

Referring to FIG. 7, there is illustrated a flowchart of a method performed by a UE according to some exemplary embodiments. As shown, the method comprises:

(701) receiving from a network node, via a higher layer, one or more information elements, SRI-PUSCH-PowerControl IEs, which provide power control settings for the transmission of at least one PUSCH, wherein each SRI-PUSCH-PowerControl IE indicates or maps to at least one pathloss reference RS;

(702) receiving from a network node, a higher layer configuration of a grant that schedules one or more PUSCH transmission(s), comprising an SRS resource indicator (SRI); and (703) obtaining a pathloss reference RS for the PUSCH transmission(s) scheduled by the higher layer grant from the SRI-PUSCH-PowerControl IE(s) indicated by the SRI.

According to an embodiment, the method comprises obtaining the pathloss reference RS from said SRI-PUSCH-PowerControl IE(s) for said PUSCH(s) when the UE receives a higher layer parameter indicating that it may receive MAC-CE messages for an update of the pathloss reference RS for a PUSCH or for an update of the mapping of a pathloss reference RS to a SRI-PUSCH-PowerControl IE.

Additional actions performed by the UE have already been described and need not be repeated.

Figure 8:
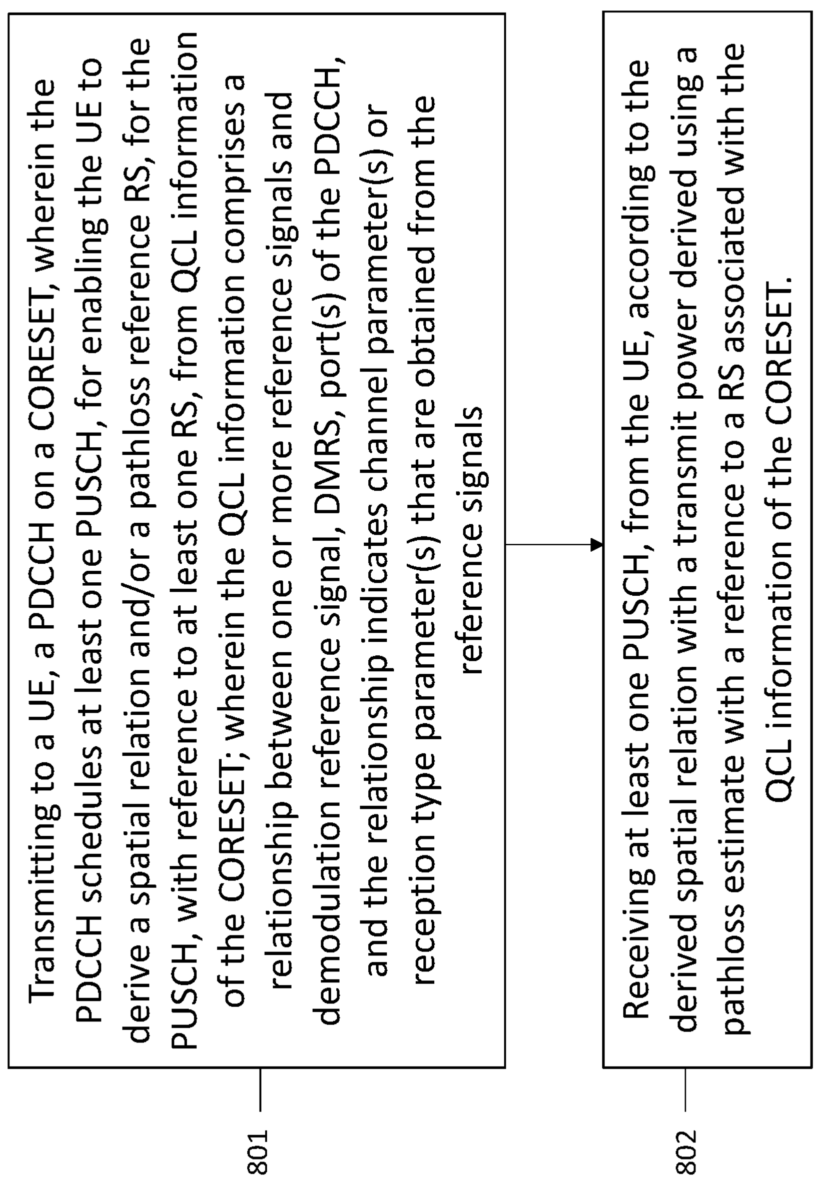
FIG. 8 illustrates a flowchart of a method performed by a network node according to some embodiments.

Referring to FIG. 8, there is illustrated a flowchart of a method performed by a network node (e.g. a gNB or a TRP) according to some previously described embodiments. As shown, the method comprises:

(801) transmitting, to a UE, at least one PDCCH transmitted by the network node on a CORESET, wherein the at least one PDCCH schedules at least one PUSCH, for enabling the UE to derive a spatial relation and/or a pathloss reference RS, for the PUSCH(s), with reference to at least one RS, from QCL information of the CORESET; wherein the QCL information comprises a relationship between one or more RSs and DMRS port(s) of the PDCCH, and the relationship indicates channel parameter(s) or reception type parameter(s) that are obtained from the RSs; and (802) receiving at least one PUSCH, from the UE, according to the derived spatial relation or with a transmit power derived using a pathloss estimate with a reference to a RS associated with the QCL information of the CORESET.

Figure 9:
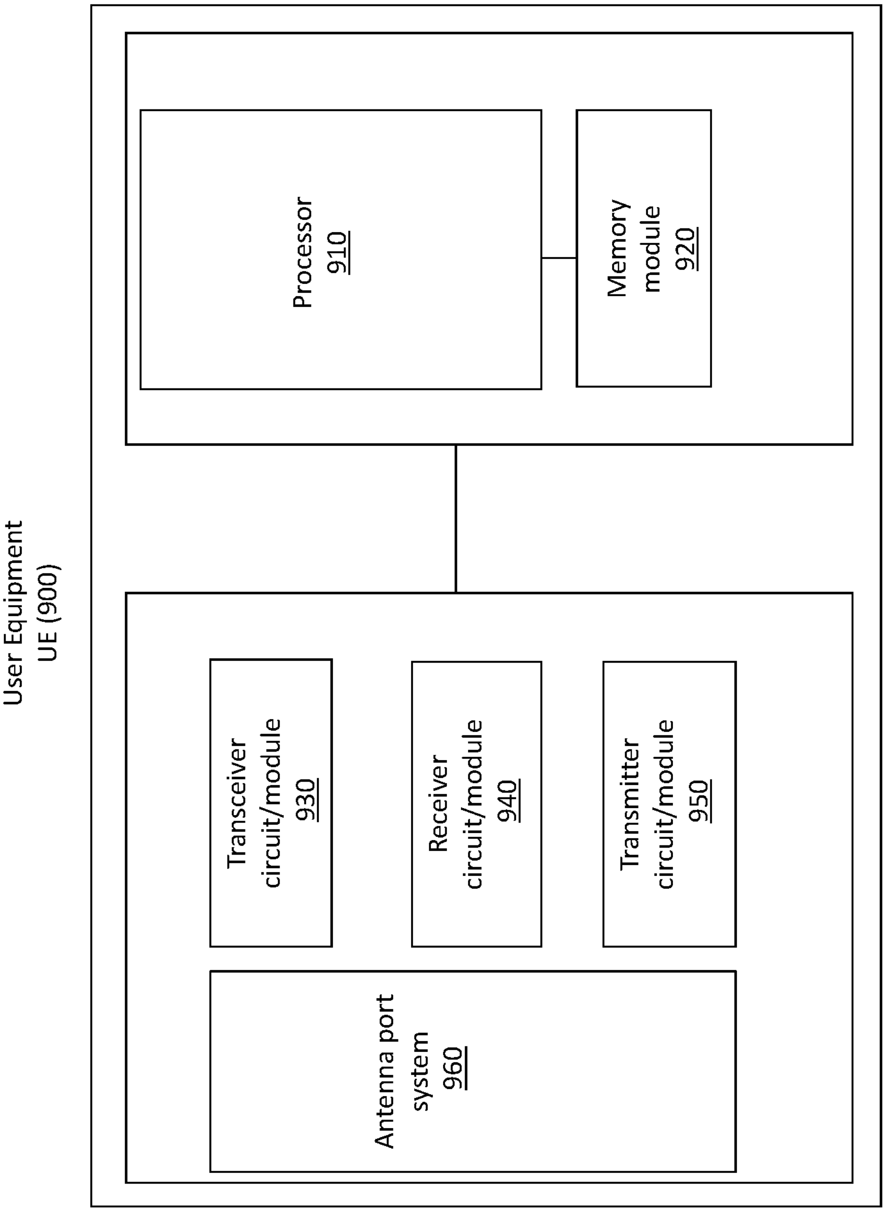
FIG. 9 illustrates a block diagram depicting a UE according to some embodiments herein.

Additional actions performed by the network node have already been described and need not be repeated In order to perform the previously described process or method steps performed by the UE, there is also provided a UE. FIG. 9 illustrates a block diagram depicting a UE. The UE 900 comprises a processor 910 or processing circuit or a processing module or a processor or means 910; a receiver circuit or receiver module 940; a transmitter circuit or transmitter module 950; a memory module 920 a transceiver circuit or transceiver module 930 which may include the transmitter circuit 950 and the receiver circuit 940. The UE 900 further comprises an antenna system 960 which includes antenna circuitry for transmitting and receiving signals to/from at least the network node. The antenna system employ beamforming as previously described. The actions performed by the UE have already been described.

The UE 900 may belong to any radio access technology including 4G or LTE, LTE-A, 5G, advanced 5G or a combination thereof that support beamforming technology. The UE comprising the processor and the memory contains instructions executable by the processor, whereby the UE 900 is operative to perform subject matter described herein.

The processing module/circuit 910 includes a processor, microprocessor, an application specific integrated circuit (ASIC), field programmable gate array (FPGA), or the like, and may be referred to as the "processor." The processor 910 controls the operation of the network node and its components. Memory (circuit or module) 920 includes a random access memory (RAM), a read only memory (ROM), and/or another type of memory to store data and instructions that may be used by processor 910. In general, it will be understood that the network node in one or more embodiments includes fixed or programmed circuitry that is configured to carry out the operations in any of the embodiments disclosed herein.

In at least one such example, the processor 910 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the UE 900 may comprise additional components.

Figure 10:
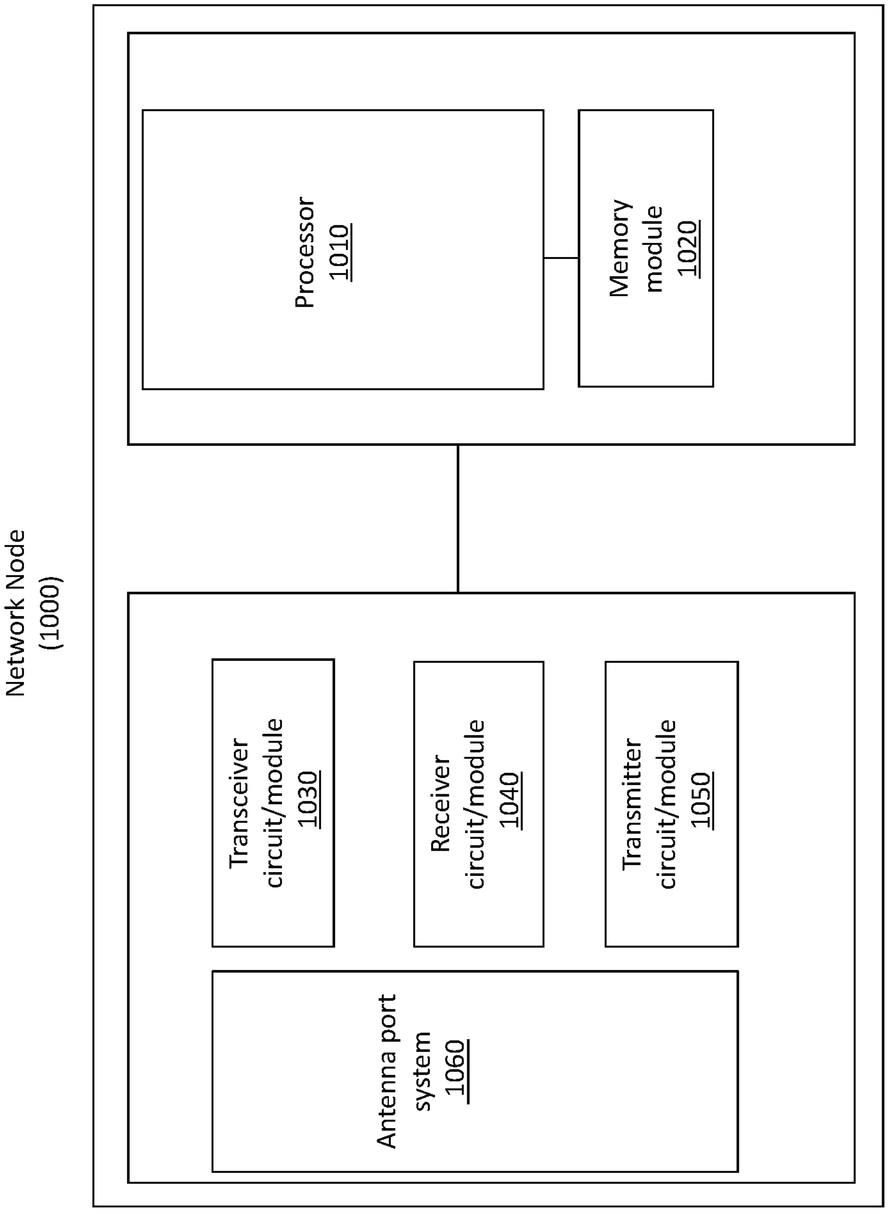
FIG. 10 illustrates a block diagram depicting a network node according to some embodiments herein.

In order to perform the previously described process or method steps performed by the network node, there is also provided a network node. FIG. 10 illustrates a block diagram depicting a network node. The network node 1000 comprises a processor 1010 or processing circuit or a processing module or a processor or means 1010; a receiver circuit or receiver module 1040; a transmitter circuit or transmitter module 1050; a memory module 1020 a transceiver circuit or transceiver module 1030 which may include the transmitter circuit 1050 and the receiver circuit 1040. The network node 1000 further comprises an antenna system 1060 which includes antenna circuitry for transmitting and receiving signals to/from at least the UE. The antenna system employ beamforming as previously described. The actions performed by the network node have already been described.

The processing module/circuit 1010 includes a processor, microprocessor, an application specific integrated circuit (ASIC), field programmable gate array (FPGA), or the like, and may be referred to as the "processor." The processor 1010 controls the operation of the network node and its components. Memory (circuit or module) 1020 includes a random access memory (RAM), a read only memory (ROM), and/or another type of memory to store data and instructions that may be used by processor 1010. In general, it will be understood that the network node in one or more embodiments includes fixed or programmed circuitry that is configured to carry out the operations in any of the embodiments disclosed herein.

In at least one such example, the processor 1010 includes a microprocessor, microcontroller, DSP, ASIC, FPGA, or other processing circuitry that is configured to execute computer program instructions from a computer program stored in a non-transitory computer-readable medium that is in or is accessible to the processing circuitry. Here, "non-transitory" does not necessarily mean permanent or unchanging storage, and may include storage in working or volatile memory, but the term does connote storage of at least some persistence. The execution of the program instructions specially adapts or configures the processing circuitry to carry out the operations disclosed in this disclosure. Further, it will be appreciated that the network node may comprise additional components.

The network node 1000 may belong to any radio access technology including 4G or LTE, LTE-A, 5G, advanced 5G or a combination thereof that support beamforming technology. The network node comprising the processor and the memory contains instructions executable by the processor, whereby the network node 1000 is operative to perform any one of the subject matter disclosed in this disclosure including the above method steps disclosed in relation to the actions performed by the network node.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Throughout this disclosure, the word "comprise" or "comprising" has been used in a non-limiting sense, i.e. meaning "consist at least of". Although specific terms may be employed herein, they are used in a generic and descriptive sense only and not for purposes of limitation. The embodiments herein may be applied in any wireless systems including LTE or 4G, LTE-A (or LTE-Advanced), 5G, advanced 5G, WiMAX, WiFi, satellite communications, TV broadcasting etc.

REFERENCES

[1] 3GPP TS 38.211 V16.0.0: "3GPP; TSG RAN; NR; Physical channels and modulation (Rel. 16)," January 2020.

[2] 3GPP TS 38.212 V16.0.0: "3GPP; TSG RAN; NR; Multiplexing and channel coding (Rel. 16)," January 2020.

[3] 3GPP TS 38.213 V16.0.0: "3GPP; TSG RAN; NR; Physical layer procedures for control (Rel. 16)," January 2020.

[4] 3GPP TS 38.214 V16.0.0: "3GPP; TSG RAN; NR; Physical layer procedures for data (Rel. 16)," January 2020.

[5] 3GPP TS 38.321 V15.8.0: "3GPP; TSG RAN; NR; Medium Access Control (MAC) protocol specification (Rel. 15)," January 2020.

[6] 3GPP TS 38.331 V15.8.0: "3GPP; TSG RAN; NR; Radio Resource Control (RRC); Protocol specification (Rel. 15)," January 2020.

[7] 3GPP TS 38.101-1 V16.2.0: "3GPP; TSG RAN; User Equipment (UE) radio transmission and reception; Part 1: Range 1 Standalone (Rel. 16)," January 2020.

[8] 3GPP TS 38.101-2 V16.2.0: "3GPP; TSG RAN; User Equipment (UE) radio transmission and reception; Part 2: Range 2 Standalone (Rel. 16)," January 2020.

The invention claimed is:

1. A method performed by a user equipment (UE), the method comprising:

receiving, from a network node, a first higher layer configuration that associates a physical uplink shared channel (PUSCH) or a PUSCH grant with a control resource set pool index, wherein the control resource set pool index is a higher layer parameter in a configuration of at least one control resource set (CORESET), wherein the CORESET comprises resources on which a PDCCH is transmitted from the network node;

receiving, from the network node, a second higher layer configuration that associates at least one PUCCH resource with said control resource set pool index; and obtaining at least one of a spatial relation and a pathloss reference RS for the PUSCH, from at least one of the spatial relation and pathloss reference RS of a PUCCH resource associated with said control resource set pool index.

2. The method according to claim 1, further comprising deriving a transmit power for said PUSCH transmission using a pathloss estimate with the pathloss reference RS of the PUCCH resource having the lowest identification number (ID) among the PUCCH resources associated with said control resource set pool index.

3. The method according to claim 1, further comprising obtaining the spatial relation for said PUSCH transmission from the spatial relation of the pathloss reference RS of the PUCCH resource having the lowest identification number (ID) among the PUCCH resources associated with said control resource set pool index.

4. The method according to claim 1, further comprising obtaining the pathloss reference RS or the spatial relation for said PUSCH from the PUCCH resource having the lowest identification number (ID) among the PUCCH resources associated with said control resource set pool index in the same uplink (UL) bandwidth part (BWP) as the PUSCH.

5. A user equipment (UE) comprising a processor and a memory containing instructions executable by the processor, whereby said UE is operative to:

receive, from a network node, a first higher layer configuration that associates a physical uplink shared channel (PUSCH) or a PUSCH grant with a control resource set pool index, wherein the control resource set pool index is a higher layer parameter in a configuration of at least one control resource set (CORESET), wherein the CORESET comprises resources on which a PDCCH is transmitted from the network node;

receive, from the network node, a second higher layer configuration that associates at least one PUCCH resource with said control resource set pool index; and obtain at least one of a spatial relation and a pathloss reference RS for the PUSCH, from at least one of the spatial relation and pathloss reference RS of a PUCCH resource associated with said control resource set pool index.

6. The UE according to claim 5, further operative to derive a transmit power for said PUSCH transmission using a pathloss estimate with the pathloss reference RS of the PUCCH resource having the lowest identification number (ID) among the PUCCH resources associated with said control resource set pool index.

7. The UE according to claim 5, further operative to obtain the spatial relation for said PUSCH transmission from the spatial relation of the pathloss reference RS of the PUCCH resource having the lowest identification number (ID) among the PUCCH resources associated with said control resource set pool index.

8. The UE according to claim 5, further operative to obtain the pathloss reference RS or the spatial relation for said PUSCH from the PUCCH resource having the lowest identification number (ID) among the PUCCH resources associated with said control resource set pool index in the same uplink (UL) bandwidth part (BWP) as the PUSCH.

9. A method performed by a network node, the method comprising:

transmitting, to a user equipment (UE), a first higher layer configuration that associates a physical uplink shared channel (PUSCH) or a PUSCH grant with a control resource set pool index, wherein the control resource set pool index is a higher layer parameter in a configuration of at least one control resource set CORESET) wherein the CORESET comprises resources on which a PDCCH is transmitted from the network node;

transmitting, to said UE, a second higher layer configuration that associates at least one physical uplink channel (PUCCH) resource with said control resource set pool index; and receiving at least one PUSCH, from said UE, with at least one of a spatial relation and a pathloss reference RS obtained by said UE from the spatial relation and/or pathloss reference RS, of a PUCCH resource associated with said control resource set pool index.

10. A network node comprising a processor and a memory containing instructions executable by the processor, whereby said network node is operative to:

transmit, to a user equipment (UE), a first higher layer configuration that associates a physical uplink shared channel (PUSCH) or a PUSCH grant with a control resource set pool index, wherein the control resource set pool index is a higher layer parameter in a configuration of at least one control resource set CORESET) wherein the CORESET comprises resources on which a PDCCH is transmitted from the network node;

transmit, to said UE, a second higher layer configuration that associates at least one physical uplink channel (PUCCH) resource with said control resource set pool index; and receive at least one PUSCH, from said UE, with at least one of a spatial relation and a pathloss reference RS obtained by said UE from the spatial relation and/or pathloss reference RS, of a PUCCH resource associated with said control resource set pool index.

* * * * *